(12) United States Patent
Hoff

(10) Patent No.: US 8,335,649 B1
(45) Date of Patent: *Dec. 18, 2012

(54) COMPUTER-IMPLEMENTED SYSTEM AND METHOD FOR ESTIMATING PHOTOVOLTAIC POWER GENERATION FOR USE IN PHOTOVOLTAIC FLEET OPERATION

(75) Inventor: Thomas E. Hoff, Napa, CA (US)

(73) Assignee: Clean Power Research, L.L.C., Napa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/453,956

(22) Filed: Apr. 23, 2012

Related U.S. Application Data

(63) Continuation of application No. 13/190,442, filed on Jul. 25, 2011, now Pat. No. 8,165,812.

(51) Int. Cl.
*G06F 19/00* (2011.01)

(52) U.S. Cl. ......... 702/3; 702/1; 702/2; 702/5; 702/189; 702/194; 702/199

(58) Field of Classification Search ............... 702/1, 2, 702/3, 5, 189, 194, 199
See application file for complete search history.

(56) References Cited

U.S. PATENT DOCUMENTS

| 8,165,812 B2 * | 4/2012 | Hoff ................................ 702/3 |
| 2007/0084502 A1 | 4/2007 | Kelly et al. | |

OTHER PUBLICATIONS

Brinkman et al., "Toward a Solar-Powered Grid." IEEE Power & Energy, vol. 9, No. 3, May/Jun. 2011.

California ISO. Summary of Preliminary Results of 33% Renewable Integration Study—2010 CPUC LTPP. May 10, 2011.

Ellis et al., "Model Makers." IEEE Power & Energy, vol. 9, No. 3, May/Jun. 2011.

Danny at al., "Analysis of solar heat gain factors using sky clearness index and energy implications." Energy Conversions and Management, Aug. 2000.

Hoff et al., "Quantifying PV Power Output Variability." Solar Energy 84 (2010) 1782-1793, Oct. 2010.

Hoff et al., "PV Power Output Variability: Calculation of Correlation Coefficients Using Satellite Insolation Data." American Solar Energy Society Annual Conference Proceedings, Raleigh, NC, May 18, 2011.

Kuszamaul et al., "Lanai High-Density Irradiance Sensor Network for Characterizing Solar Resource Variability of MW-Scale PV System." 35th Photovoltaic Specialists Conference, Honolulu, HI. Jun. 20-25, 2010.

Serban C., "Estimating CLear SKy Solar Global Radiation Using Clearness Index, for Brasov Urban Area".

(Continued)

*Primary Examiner* — Sujoy Kundu
(74) *Attorney, Agent, or Firm* — Patrick J. S. Inouye

(57) ABSTRACT

A computer-implemented system and method for estimating photovoltaic power generation for use in photovoltaic fleet operation is provided. A set of sky clearness indexes is generated as a ratio of each irradiance observation in a set of irradiance observations that has been regularly measured for a plurality of locations, which are each within a geographic region suitable for operation of a photovoltaic fleet, and clear sky irradiance. A time series of the set of the sky clearness indexes is formed for all of the locations within the geographic region. Fleet irradiance statistics for the photovoltaic fleet are generated through statistical evaluation of the time series of the set of the sky clearness indexes. Power statistics for the photovoltaic fleet are built as a function of the fleet irradiance statistics and an overall power rating of the photovoltaic fleet.

22 Claims, 23 Drawing Sheets

OTHER PUBLICATIONS

Mills et al., "Dark Shadows." IEEE Power & Energy, vol. 9, No. 3, May/Jun. 2011.

Mills et al., "Implications of Wide-Area Geographic Diversity for Short-Term Variability of Solar Power." Lawrence Berkeley National Laboratory Technical Report LBNL-3884E.

Perez et al., "Parameterization of site-specific short-term irradiance variability." Solar Energy, 85 (2011) 1343-1345, Nov. 2010.

Perez et al., "Short-term irradiance variability correlation as a function of distance." Solar Energy, Mar. 2011.

Philip, J., "The Probability Distribution of the Distance Between Two Random Points in a Box." www.math.kth.se/~johanph/habc.pdf. Dec. 2007.

Stein, J., "Simulation of 1-Minute Power Output from Utility-Scale Photovoltaic Generation Systems." American Solar Energy Society Annual Conference Proceedings, Raleigh, NC, May 18, 2011.

Solar Anywhere, 2011. Web-Based Service that Provides Hourly, Satellite-Derived Solar Irradiance Data Forecasted 7 days Ahead and Archival Data back to Jan. 1, 1998. www.SolarAnywhere.com.

Stokes et al., "The atmospheric radiation measurement (ARM) program: programmatic background and design of the cloud and radiation test bed." Bulletin of American Meteorological Society vol. 75, No. 7, pp. 1201-1221, Jul. 1994.

Hoff et al., "Modeling PV Fleet Output Variability," Solar Energy, May 2011.

Olopade at al., "Solar Radiation Characteristics and the performance of Photovoltaic (PV) Modules in a Tropical Station." Journal Sci. Res. Dev. vol. 11, 100-109, 2008/2009.

* cited by examiner

Napa, CA

Combine with Fleet Configuration

COMPUTER-IMPLEMENTED SYSTEM AND METHOD FOR ESTIMATING PHOTOVOLTAIC POWER GENERATION FOR USE IN PHOTOVOLTAIC FLEET OPERATION

CROSS-REFERENCE TO RELATED APPLICATION

This patent application is a continuation of U.S. patent application Ser. No. 13/190,442, filed Jul. 25, 2011, U.S. Pat. No. 8,165,812, issued Apr. 24, 2012, the priority date of which is claimed and the disclosure of which is incorporated by reference.

This invention was made with State of California support under Agreement Number 722. The California Public Utilities Commission of the State of California has certain rights to this invention.

FIELD

This application relates in general to photovoltaic power generation fleet planning and operation and, in particular, to a computer-implemented system and method for estimating photovoltaic power generation for use in photovoltaic fleet operation.

BACKGROUND

The manufacture and usage of photovoltaic systems has advanced significantly in recent years due to a continually growing demand for renewable energy resources. The cost per watt of electricity generated by photovoltaic systems has decreased dramatically, especially when combined with government incentives offered to encourage photovoltaic power generation. Photovoltaic systems are widely applicable as standalone off-grid power systems, sources of supplemental electricity, such as for use in a building or house, and as power grid-connected systems. Typically, when integrated into a power grid, photovoltaic systems are collectively operated as a fleet, although the individual systems in the fleet may be deployed at different physical locations within a geographic region.

Grid connection of photovoltaic power generation fleets is a fairly recent development. In the United States, the Energy Policy Act of 1992 deregulated power utilities and mandated the opening of access to power grids to outsiders, including independent power providers, electricity retailers, integrated energy companies, and Independent System Operators (ISOs) and Regional Transmission Organizations (RTOs). A power grid is an electricity generation, transmission, and distribution infrastructure that delivers electricity from supplies to consumers. As electricity is consumed almost immediately upon production, power generation and consumption must be balanced across the entire power grid. A large power failure in one part of the grid could cause electrical current to reroute from remaining power generators over transmission lines of insufficient capacity, which creates the possibility of cascading failures and widespread power outages.

As a result, both planners and operators of power grids need to be able to accurately gauge on-going power generation and consumption, and photovoltaic fleets participating as part of a power grid are expected to exhibit predictable power generation behaviors. Power production data is needed at all levels of a power grid to which a photovoltaic fleet is connected, especially in smart grid integration, as well as by operators of distribution channels, power utilities, ISOs, and RTOs. Photovoltaic fleet power production data is particularly crucial where a fleet makes a significant contribution to the grid's overall energy mix.

A grid-connected photovoltaic fleet could be dispersed over a neighborhood, utility region, or several states and its constituent photovoltaic systems could be concentrated together or spread out. Regardless, the aggregate grid power contribution of a photovoltaic fleet is determined as a function of the individual power contributions of its constituent photovoltaic systems, which in turn, may have different system configurations and power capacities. The system configurations may vary based on operational features, such as size and number of photovoltaic arrays, the use of fixed or tracking arrays, whether the arrays are tilted at different angles of elevation or are oriented along differing azimuthal angles, and the degree to which each system is covered by shade due to clouds.

Photovoltaic system power output is particularly sensitive to shading due to cloud cover, and a photovoltaic array with only a small portion covered in shade can suffer a dramatic decrease in power output. For a single photovoltaic system, power capacity is measured by the maximum power output determined under standard test conditions and is expressed in units of Watt peak (Wp). However, at any given time, the actual power could vary from the rated system power capacity depending upon geographic location, time of day, weather conditions, and other factors. Moreover, photovoltaic fleets with individual systems scattered over a large geographical area are subject to different location-specific cloud conditions with a consequential affect on aggregate power output.

Consequently, photovoltaic fleets operating under cloudy conditions can exhibit variable and unpredictable performance. Conventionally, fleet variability is determined by collecting and feeding direct power measurements from individual photovoltaic systems or equivalent indirectly derived power measurements into a centralized control computer or similar arrangement. To be of optimal usefulness, the direct power measurement data must be collected in near real time at fine grained time intervals to enable a high resolution time series of power output to be created. However, the practicality of such an approach diminishes as the number of systems, variations in system configurations, and geographic dispersion of the photovoltaic fleet grow. Moreover, the costs and feasibility of providing remote power measurement data can make high speed data collection and analysis insurmountable due to the bandwidth needed to transmit and the storage space needed to contain collected measurements, and the processing resources needed to scale quantitative power measurement analysis upwards as the fleet size grows.

Converting area-based satellite imagery of overhead sky clearness into point-based data is a necessary preliminary step in determining the power output of a photovoltaic system. Satellite imagery, along with direct power measurements and weather station readings, is one of several sources of cloudy conditions data. However, satellite imagery is typically provided as a set of pixels. Each satellite observation represents irradiance values averaged across the area of each pixel, rather than at a single point location, which is needed to determining power output. Conversion of area statistics to point statistics, especially power variance, must compensate for the geographic area of individual pixel coverage in light of point increment data requirements. For instance, one square kilometer of satellite pixel coverage contains one million square meter point increments. Moreover, satellite pixel conversion becomes combinatoric as pixel coverage resolution decreases and point increment size increases.

For instance, one direct approach to obtaining high speed time series power production data from a fleet of existing photovoltaic systems is to install physical meters on every photovoltaic system, record the electrical power output at a desired time interval, such as every 10 seconds, and sum the recorded output across all photovoltaic systems in the fleet at each time interval. The totalized power data from the photovoltaic fleet could then be used to calculate the time-averaged fleet power, variance of fleet power, and similar values for the rate of change of fleet power. An equivalent direct approach to obtaining high speed time series power production data for a future photovoltaic fleet or an existing photovoltaic fleet with incomplete metering and telemetry is to collect solar irradiance data from a dense network of weather monitoring stations covering all anticipated locations of interest at the desired time interval, use a photovoltaic performance model to simulate the high speed time series output data for each photovoltaic system individually, and then sum the results at each time interval.

With either direct approach, several difficulties arise. First, in terms of physical plant, calibrating, installing, operating, and maintaining meters and weather stations is expensive and detracts from cost savings otherwise afforded through a renewable energy source. Similarly, collecting, validating, transmitting, and storing high speed data for every photovoltaic system or location requires collateral data communications and processing infrastructure, again at possibly significant expense. Moreover, data loss occurs whenever instrumentation or data communications do not operate reliably.

Second, in terms of inherent limitations, both direct approaches only work for times, locations, and photovoltaic system configurations when and where meters are pre-installed; thus, high speed time series power production data is unavailable for all other locations, time periods, and photovoltaic system configurations. Both direct approaches also cannot be used to directly forecast future photovoltaic system performance since meters must be physically present at the time and location of interest. Fundamentally, data also must be recorded at the time resolution that corresponds to the desired output time resolution. While low time-resolution results can be calculated from high resolution data, the opposite calculation is not possible. For example, photovoltaic fleet behavior with a 10-second resolution can not be determined from data collected by existing utility meters that collect the data with a 15-minute resolution.

The few solar data networks that exist in the United States, such as the ARM network, described in G. M. Stokes et al., "The atmospheric radiation measurement (ARM) program: programmatic background and design of the cloud and radiation test bed," Bulletin of Am. Meteorological Society 75, 1201-1221 (1994), the disclosure of which is incorporated by reference, and the SURFRAD network, do not have high density networks (the closest pair of stations in the ARM network is 50 km apart) nor have they been collecting data at a fast rate (the fastest rate is 20 seconds at ARM network and one minute at SURFRAD network).

The limitations of the direct measurement approaches have prompted researchers to evaluate other alternatives. Researchers have installed dense networks of solar monitoring devices in a few limited locations, such as described in S. Kuszamaul et al., "Lanai High-Density Irradiance Sensor Network for Characterizing Solar Resource Variability of MW-Scale PV System." 35th Photovoltaic Specialists Conf., Honolulu, Hi. (Jun. 20-25, 2010), and R. George, "Estimating Ramp Rates for Large PV Systems Using a Dense Array of Measured Solar Radiation Data," Am. Solar Energy Society Annual Conf. Procs., Raleigh, N.C. (May 18, 2011), the disclosures of which are incorporated by reference. As data are being collected, the researchers examine the data to determine if there are underlying models that can translate results from these devices to photovoltaic fleet production at a much broader area, yet fail to provide translation of the data. In addition, half-hour or hourly satellite irradiance data for specific locations and time periods of interest have been combined with randomly selected high speed data from a limited number of ground-based weather stations, such as described in CAISO 2011. "Summary of Preliminary Results of 33% Renewable Integration Study—2010," Cal. Public Util. Comm. LTPP Docket No. R.10-05-006 (Apr. 29, 2011) and J. Stein, "Simulation of 1-Minute Power Output from Utility-Scale Photovoltaic Generation Systems," Am. Solar Energy Society Annual Conf. Procs., Raleigh, N.C. (May 18, 2011), the disclosures of which are incorporated by reference. This approach, however, does not produce time synchronized photovoltaic fleet variability for any particular time period because the locations of the ground-based weather stations differ from the actual locations of the fleet. While such results may be useful as input data to photovoltaic simulation models for purpose of performing high penetration photovoltaic studies, they are not designed to produce data that could be used in grid operational tools.

Therefore, a need remains for an approach to efficiently estimating power output of a photovoltaic fleet in the absence of high speed time series power production data. As well, a further need remains for an approach to adapting satellite pixel data for a geographic region into a form usable in determining photovoltaic fleet power output.

SUMMARY

Approaches to generating high-speed time series photovoltaic fleet performance data and to converting satellite area imagery into point data are described.

One embodiment provides a computer-implemented system and method for estimating photovoltaic power generation for use in photovoltaic fleet operation. A set of sky clearness indexes is generated as a ratio of each irradiance observation in a set of irradiance observations that has been regularly measured for a plurality of locations, which are each within a geographic region suitable for operation of a photovoltaic fleet, and clear sky irradiance. A time series of the set of the sky clearness indexes is formed for all of the locations within the geographic region. Fleet irradiance statistics for the photovoltaic fleet are generated through statistical evaluation of the time series of the set of the sky clearness indexes. Power statistics for the photovoltaic fleet are built as a function of the fleet irradiance statistics and an overall power rating of the photovoltaic fleet.

A further embodiment provides a computer-implemented system and method for estimating power data for a photovoltaic power generation fleet using area-to-point conversion of satellite imagery. Satellite imagery data of overhead sky clearness for a geographic region within which a photovoltaic fleet is located is assembled. Each set of solar irradiance data includes a time series of solar irradiance observations electronically recorded at successive time periods spaced at input time intervals. Each solar irradiance observation includes measured irradiance. A set of pixels within the satellite imagery data corresponding to a bounded area within the geographic region is identified. Each pixel represents collective irradiance over a plurality of points within the bounded area. The solar irradiance data in the time series is converted over each of the time periods into a set of point clearness indexes for each of the points relative to clear sky global horizontal irradiance. The set of point clearness indexes is interpreted as area irradiance statistics. The area irradiance statistics are converted to irradiance statistics for an average point within the set of pixels. The irradiance statistics are determined as average point statistics. Each average point statistic includes an average of all values of the set of pixels. The irradiance statistics for each of the locations are combined into fleet irradiance statistics applicable over the geographic region. Power statistics for the photovoltaic fleet are built as a function of the fleet irradiance statistics and a power rating of the photovoltaic fleet. A time series of the power statistics for the photovoltaic fleet is generated by applying a time lag correlation coefficient for an output time interval to the power statistics over each of the input time intervals Some of the notable elements of this methodology non-exclusively include:

(1) Employing a fully derived statistical approach to generating high-speed photovoltaic fleet production data;

(2) Using a small sample of input data sources as diverse as ground-based weather stations, existing photovoltaic systems, or solar data calculated from satellite images;

(3) Producing results that are usable for any photovoltaic fleet configuration;

(4) Supporting any time resolution, even those time resolutions faster than the input data collection rate; and (5) Providing results in a form that is useful and usable by electric power grid planning and operation tools.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

DETAILED DESCRIPTION

Photovoltaic cells employ semiconductors exhibiting a photovoltaic effect to generate direct current electricity through conversion of solar irradiance. Within each photovoltaic cell, light photons excite electrons in the semiconductors to create a higher state of energy, which acts as a charge carrier for electric current. A photovoltaic system uses one or more photovoltaic panels that are linked into an array to convert sunlight into electricity. In turn, a collection of photovoltaic systems can be collectively operated as a photovoltaic fleet when integrated into a power grid, although the constituent photovoltaic systems may actually be deployed at different physical locations within a geographic region.

Figure 1:
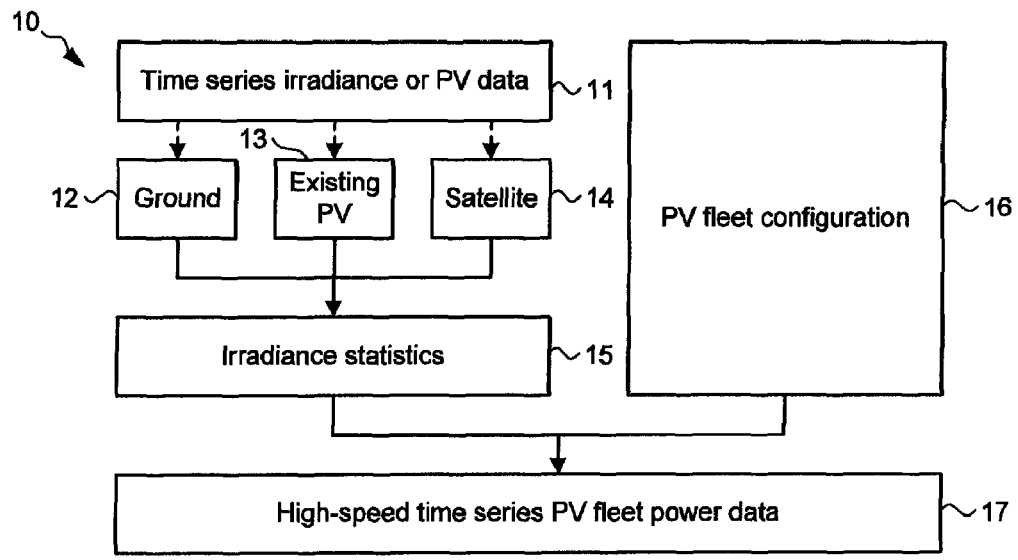
FIG. 1 is a flow diagram showing a computer-implemented method for estimating photovoltaic power generation for use in photovoltaic fleet operation in accordance with one embodiment.

To aid with the planning and operation of photovoltaic fleets, whether at the power grid, supplemental, or standalone power generation levels, high resolution time series of power output data is needed to efficiently estimate photovoltaic fleet power production. The variability of photovoltaic fleet power generation under cloudy conditions can be efficiently estimated, even in the absence of high speed time series power production data, by applying a fully derived statistical approach. FIG. 1 is a flow diagram showing a computer-implemented method 10 for estimating power data for a photovoltaic power generation fleet in accordance with one embodiment. The method 10 can be implemented in software and execution of the software can be performed on a computer system, such as further described infra, as a series of process or method modules or steps.

Figure 3:
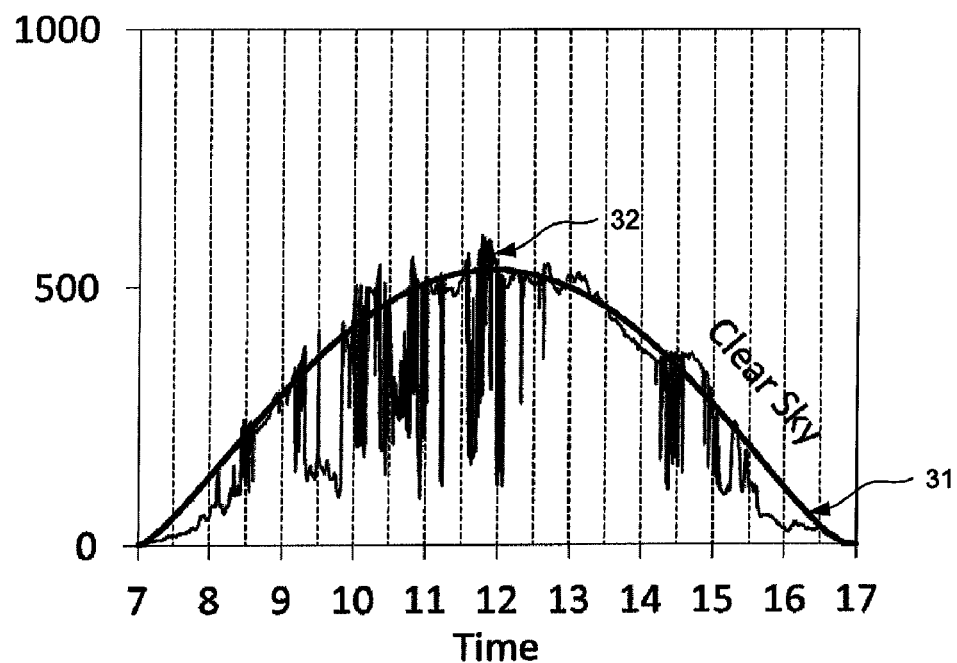
FIG. 3 is a graph depicting, by way of example, ten hours of time series irradiance data collected from a ground-based weather station with 10-second resolution.

Preliminarily, a time series of solar irradiance data is obtained (step 11) for a set of locations representative of the geographic region within which the photovoltaic fleet is located or intended to operate, as further described infra with reference to FIG. 3. Each time series contains solar irradiance observations electronically recorded at known input time intervals over successive time periods. The solar irradiance observations can include irradiance measured by a representative set of ground-based weather stations (step 12), existing photovoltaic systems (step 13), satellite observations (step 14), or some combination thereof. Other sources of the solar irradiance data are possible.

Next, the solar irradiance data in the time series is converted over each of the time periods, such as at half-hour intervals, into a set of clearness indexes, which are calculated relative to clear sky global horizontal irradiance. The set of clearness indexes are interpreted into as irradiance statistics (step 15), as further described infra with reference to FIGS. 4-6. The irradiance statistics for each of the locations is combined into fleet irradiance statistics applicable over the geographic region of the photovoltaic fleet. A time lag correlation coefficient for an output time interval is also determined to enable the generation of an output time series at any time resolution, even faster than the input data collection rate.

Finally, power statistics, including a time series of the power statistics for the photovoltaic fleet, are generated (step 17) as a function of the fleet irradiance statistics and system configuration, particularly the geographic distribution and power rating of the photovoltaic systems in the fleet (step 16). The resultant high-speed time series fleet performance data can be used to predictably estimate power output and photovoltaic fleet variability by fleet planners and operators, as well as other interested parties.

The calculated irradiance statistics are combined with the photovoltaic fleet configuration to generate the high-speed time series photovoltaic production data. In a further embodiment, the foregoing methodology can be may also require conversion of weather data for a region, such as data from satellite regions, to average point weather data. A non-optimized approach would be to calculate a correlation coefficient matrix on-the-fly for each satellite data point. Alternatively, a conversion factor for performing area-to-point conversion of satellite imagery data is described herein.

Figure 2:
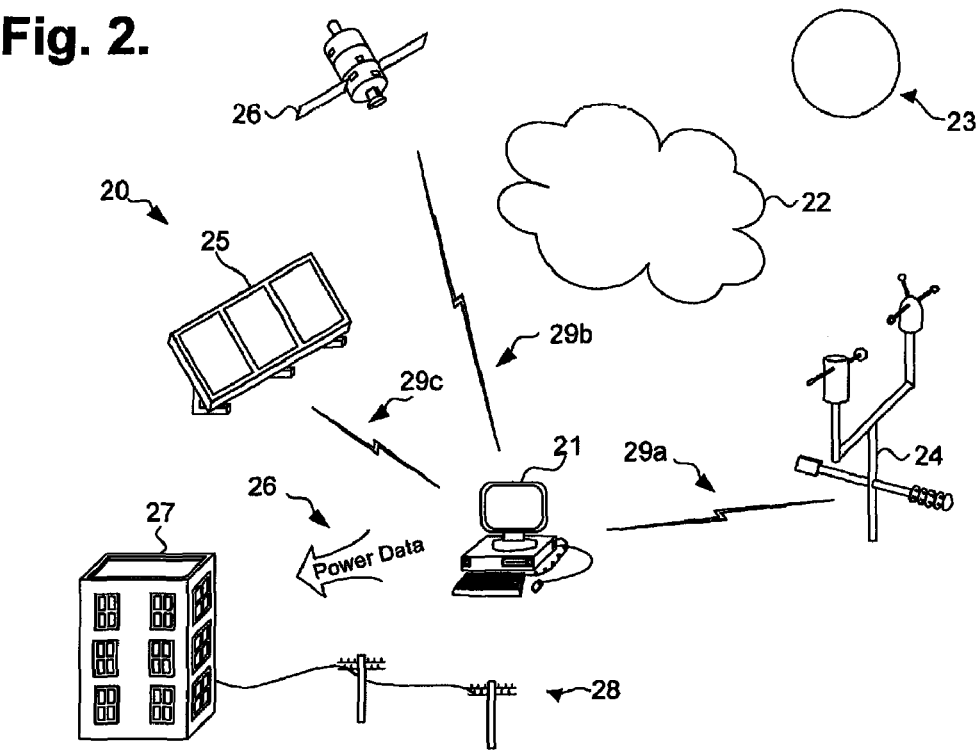
FIG. 2 is a block diagram showing a computer-implemented system for estimating photovoltaic power generation for use in photovoltaic fleet operation in accordance with one embodiment.

The high resolution time series of power output data is determined in the context of a photovoltaic fleet, whether for an operational fleet deployed in the field, by planners considering fleet configuration and operation, or by other individuals interested in photovoltaic fleet variability and prediction, such as described in commonly-assigned U.S. Patent application, entitled "Computer-Implemented System and Method for Estimating Power Data for a Photovoltaic Power Generation Fleet," Ser. No. 13/190,442, filed Jul. 25, 2011, pending, and U.S. Patent application, entitled "Computer-Implemented System And Method For Determining Point-to-Point Correlation of Sky Clearness for Photovoltaic Power Generation Fleet Output Estimation," Ser. No. 13/190,435, filed Jul. 25, 2011, pending, the disclosure of which is incorporated by reference. FIG. 2 is a block diagram showing a computer-implemented system 20 for estimating photovoltaic power generation for use in photovoltaic fleet operation in accordance with one embodiment. Time series power output data for a photovoltaic fleet is generated using observed field conditions relating to overhead sky clearness. Solar irradiance 23 relative to prevailing cloudy conditions 22 in a geographic region of interest is measured. Direct solar irradiance measurements can be collected by ground-based weather stations 24. Solar irradiance measurements can also be inferred by the actual power output of existing photovoltaic systems 25. Additionally, satellite observations 26 can be obtained for the geographic region. Both the direct and inferred solar irradiance measurements are considered to be sets of point values that relate to a specific physical location, whereas satellite imagery data is considered to be a set of area values that need to be converted into point values, as further described infra. Still other sources of solar irradiance measurements are possible.

The solar irradiance measurements are centrally collected by a computer system 21 or equivalent computational device. The computer system 21 executes the methodology described supra with reference to FIG. 1 and as further detailed herein to generate time series power data 26 and other analytics, which can be stored or provided 27 to planners, operators, and other parties for use in solar power generation 28 planning and operations. The data feeds 29a-c from the various sources of solar irradiance data need not be high speed connections; rather, the solar irradiance measurements can be obtained at an input data collection rate and application of the methodology described herein provides the generation of an output time series at any time resolution, even faster than the input time resolution. The computer system 21 includes hardware components conventionally found in a general purpose programmable computing device, such as a central processing unit, memory, user interfacing means, such as a keyboard, mouse, and display, input/output ports, network interface, and non-volatile storage, and execute software programs structured into routines, functions, and modules for execution on the various systems. In addition, other configurations of computational resources, whether provided as a dedicated system or arranged in client-server or peer-to-peer topologies, and including unitary or distributed processing, communications, storage, and user interfacing, are possible.

The detailed steps performed as part of the methodology described supra with reference to FIG. 1 will now be described.

Obtain Time Series Irradiance Data

The first step is to obtain time series irradiance data from representative locations. This data can be obtained from ground-based weather stations, existing photovoltaic systems, a satellite network, or some combination sources, as well as from other sources. The solar irradiance data is collected from several sample locations across the geographic region that encompasses the photovoltaic fleet.

Direct irradiance data can be obtained by collecting weather data from ground-based monitoring systems. FIG. 3 is a graph depicting, by way of example, ten hours of time series irradiance data collected from a ground-based weather station with 10-second resolution, that is, the time interval equals ten seconds. In the graph, the blue line is the measured horizontal irradiance and the black line is the calculated clear sky horizontal irradiance for the location of the weather station.

Irradiance data can also be inferred from select photovoltaic systems using their electrical power output measurements. A performance model for each photovoltaic system is first identified, and the input solar irradiance corresponding to the power output is determined.

Finally, satellite-based irradiance data can also be used. As satellite imagery data is pixel-based, the data for the geographic region is provided as a set of pixels, which span across the region and encompassing the photovoltaic fleet.

Calculate Irradiance Statistics

The time series irradiance data for each location is then converted into time series clearness index data, which is then used to calculate irradiance statistics, as described infra.

Clearness Index (Kt)

Figure 4:
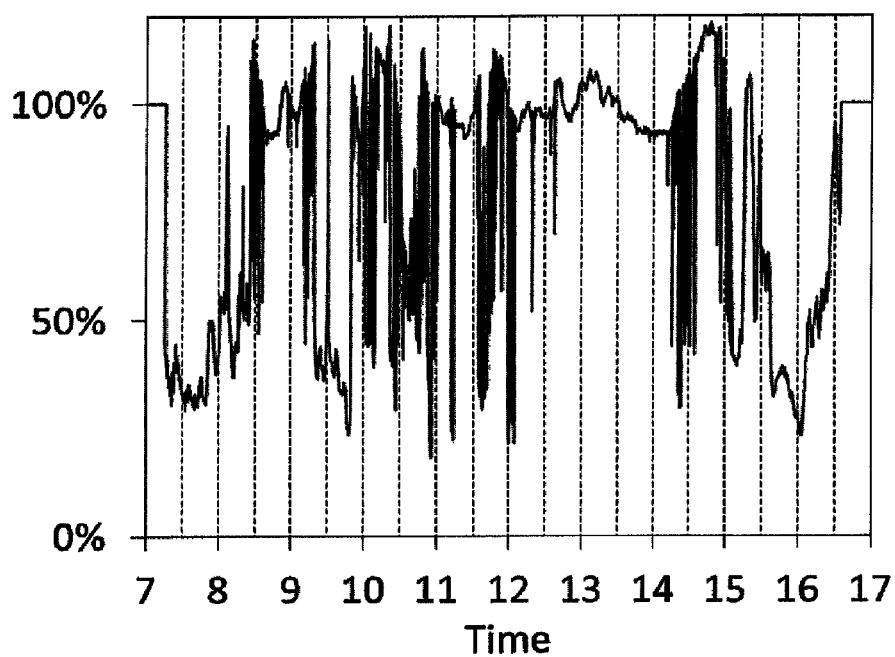
FIG. 4 is a graph depicting, by way of example, the clearness index that corresponds to the irradiance data presented in FIG. 3.

The clearness index (Kt) is calculated for each observation in the data set. In the case of an irradiance data set, the clearness index is determined by dividing the measured global horizontal irradiance by the clear sky global horizontal irradiance, may be obtained from any of a variety of analytical methods. FIG. 4 is a graph depicting, by way of example, the clearness index that corresponds to the irradiance data presented in FIG. 3. Calculation of the clearness index as described herein is also generally applicable to other expressions of irradiance and cloudy conditions, including global horizontal and direct normal irradiance.

Change in Clearness Index (ΔKt)

Figure 5:
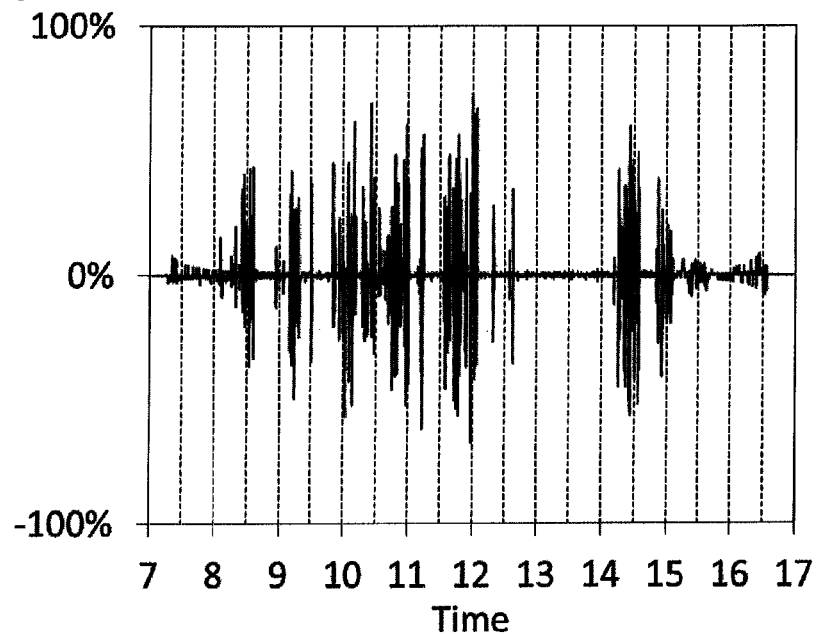
FIG. 5 is a graph depicting, by way of example, the change in clearness index that corresponds to the clearness index presented in FIG. 4.

The change in clearness index (ΔKt) over a time increment of Δt is the difference between the clearness index starting at the beginning of a time increment t and the clearness index starting at the beginning of a time increment t, plus a time increment Δt. FIG. 5 is a graph depicting, by way of example, the change in clearness index that corresponds to the clearness index presented in FIG. 4.

Time Period

The time series data set is next divided into time periods, for instance, from five to sixty minutes, over which statistical calculations are performed. The determination of time period is selected depending upon the end use of the power output data and the time resolution of the input data. For example, if fleet variability statistics are to be used to schedule regulation reserves on a 30-minute basis, the time period could be selected as 30 minutes. The time period must be long enough to contain a sufficient number of sample observations, as defined by the data time interval, yet be short enough to be usable in the application of interest. An empirical investigation may be required to determine the optimal time period as appropriate.

Fundamental Statistics

Table 1 lists the irradiance statistics calculated from time series data for each time period at each location in the geographic region. Note that time period and location subscripts are not included for each statistic for purposes of notational simplicity.

TABLE 1

| Statistic | Variable |
|---|---|
| Mean clearness index | $\mu_{Kt}$ |
| Variance clearness index | $\sigma_{Kt}^2$ |
| Mean clearness index change | $\mu_{\Delta Kt}$ |
| Variance clearness index change | $\mu_{\Delta Kt}^2$ |

Table 2 lists sample clearness index time series data and associated irradiance statistics over five-minute time periods. The data is based on time series clearness index data that has a one-minute time interval. The analysis was performed over a five-minute time period. Note that the clearness index at 12:06 is only used to calculate the clearness index change and not to calculate the irradiance statistics.

TABLE 2

| | Clearness Index (Kt) | Clearness Index Change (ΔKt) |
|---|---|---|
| 12:00 | 50% | 40% |
| 12:01 | 90% | 0% |
| 12:02 | 90% | −80% |
| 12:03 | 10% | 0% |
| 12:04 | 10% | 80% |
| 12:05 | 90% | −40% |
| 12:06 | 50% | |
| Mean (μ) | 57% | 0% |
| Variance (σ²) | 13% | 27% |

The mean clearness index change equals the first clearness index in the succeeding time period, minus the first clearness index in the current time period divided by the number of time intervals in the time period. The mean clearness index change equals zero when these two values are the same. The mean is small when there are a sufficient number of time intervals. Furthermore, the mean is small relative to the clearness index change variance. To simplify the analysis, the mean clearness index change is assumed to equal zero for all time periods.

Figure 6:
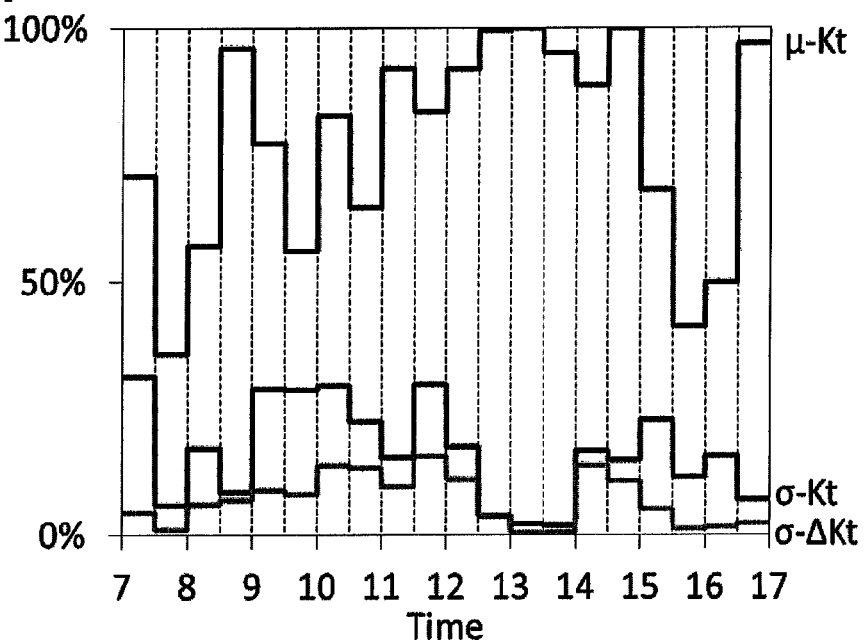
FIG. 6 is a graph depicting, by way of example, the irradiance statistics that correspond to the clearness index in FIG. 4 and the change in clearness index in FIG. 5.

FIG. 6 is a graph depicting, by way of example, the irradiance statistics that correspond to the clearness index in FIG. 4 and the change in clearness index in FIG. 5 using a half-hour hour time period. Note that FIG. 6 presents the standard deviations, determined as the square root of the variance, rather than the variances, to present the standard deviations in terms that are comparable to the mean.

Calculate Fleet Irradiance Statistics

Irradiance statistics were calculated in the previous section for the data stream at each sample location in the geographic region. The meaning of these statistics, however, depends upon the data source. Irradiance statistics calculated from a ground-based weather station data represent results for a specific geographical location as point statistics. Irradiance statistics calculated from satellite data represent results for a region as area statistics. For example, if a satellite pixel corresponds to a one square kilometer grid, then the results represent the irradiance statistics across a physical area one kilometer square.

Average irradiance statistics across the photovoltaic fleet region are a critical part of the methodology described herein. This section presents the steps to combine the statistical results for individual locations and calculate average irradiance statistics for the region as a whole. The steps differs depending upon whether point statistics or area statistics are used.

Irradiance statistics derived from ground-based sources simply need to be averaged to form the average irradiance statistics across the photovoltaic fleet region. Irradiance statistics from satellite sources are first converted from irradiance statistics for an area into irradiance statistics for an average point within the pixel. The average point statistics are then averaged across all satellite pixels to determine the average across the photovoltaic fleet region.

Mean Clearness Index ($\mu_{\overline{Kt}}$) and Mean Change in Clearness Index ($\mu_{\overline{\Delta Kt}}$)

The mean clearness index should be averaged no matter what input data source is used, whether ground, satellite, or photovoltaic system originated data. If there are N locations, then the average clearness index across the photovoltaic fleet region is calculated as follows.

$$\mu_{\overline{Kt}} = \sum_{i=1}^{N} \frac{\mu_{Kt_i}}{N} \tag{1}$$

The mean change in clearness index for any period is assumed to be zero. As a result, the mean change in clearness index for the region is also zero.

$$\mu_{\overline{\Delta Kt}} = 0 \tag{2}$$

Convert Area Variance to Point Variance

The following calculations are required if satellite data is used as the source of irradiance data. Satellite observations represent values averaged across the area of the pixel, rather than single point observations. The clearness index derived from this data ($Kt^{Area}$) may therefore be considered an average of many individual point measurements.

$$Kt^{Area} = \sum_{i=1}^{N} \frac{Kt^i}{N} \qquad (3)$$

As a result, the variance of the clearness index based on satellite data can be expressed as the variance of the average clearness index across all locations within the satellite pixel.

$$\sigma^2_{Kt-Area} = \text{VAR}[Kt^{Area}] = \text{VAR}\left[\sum_{i=1}^{N} \frac{Kt^i}{N}\right] \qquad (4)$$

The variance of a sum, however, equals the sum of the covariance matrix.

$$\sigma^2_{Kt-Area} = \left(\frac{1}{N^2}\right) \sum_{i=1}^{N} \sum_{j=1}^{N} \text{COV}[Kt^i, Kt^j] \qquad (5)$$

Let $\rho^{Kt^i, Kt^j}$ represents the correlation coefficient between the clearness index at location i and location j within the satellite pixel. By definition of correlation coefficient, COV$[Kt^i, Kt^j] = \sigma_{Kt}^i \sigma_{Kt}^j \rho^{Kt^i, Kt^j}$. Furthermore, since the objective is to determine the average point variance across the satellite pixel, the standard deviation at any point within the satellite pixel can be assumed to be the same and equals $\sigma_{Kt}$, which means that $\sigma_{Kt}^i \sigma_{Kt}^j = \sigma_{Kt}^2$ for all location pairs. As a result, COV$[Kt^i, Kt^j] = \sigma_{Kt}^2 \rho^{Kt^i, Kt^j}$. Substituting this result into Equation (5) and simplify.

$$\sigma^2_{Kt-Area} = \sigma_{Kt}^2 \left(\frac{1}{N^2}\right) \sum_{i=1}^{N} \sum_{j=1}^{N} \rho^{Kt^i, Kt^j} \qquad (6)$$

Suppose that data was available to calculate the correlation coefficient in Equation (6). The computational effort required to perform a double summation for many points can be quite large and computationally resource intensive. For example, a satellite pixel representing a one square kilometer area contains one million square meter increments. With one million increments, Equation (6) would require one trillion calculations to compute.

The calculation can be simplified by conversion into a continuous probability density function of distances between location pairs across the pixel and the correlation coefficient for that given distance, as further described supra. Thus, the irradiance statistics for a specific satellite pixel, that is, an area statistic, rather than a point statistics, can be converted into the irradiance statistics at an average point within that pixel by dividing by a "Area" term (A), which corresponds to the area of the satellite pixel. Furthermore, the probability density function and correlation coefficient functions are generally assumed to be the same for all pixels within the fleet region, making the value of A constant for all pixels and reducing the computational burden further. Details as to how to calculate A are also further described supra.

$$\sigma^2_{Kt} = \frac{\sigma^2_{Kt-Area}}{A^{SatellitePixel}_{Kt}} \qquad (7)$$

where:

$$A^{Satellite\ Pixel}_{Kt} = \left(\frac{1}{N^2}\right) \sum_{i=1}^{N} \sum_{j=1}^{N} \rho^{i,j} \qquad (8)$$

Likewise, the change in clearness index variance across the satellite region can also be converted to an average point estimate using a similar conversion factor, $A_{\Delta Kt}^{Area}$.

$$\sigma^2_{\Delta Kt} = \frac{\sigma^2_{\Delta Kt-Area}}{A^{SatellitePixel}_{\Delta Kt}} \qquad (9)$$

Variance of Clearness Index ($\sigma_{\overline{Kt}}^2$) and Variance of Change in Clearness Index ($\sigma_{\overline{\Delta Kt}}^2$)

At this point, the point statistics ($\sigma_{Kt}^2$ and $\sigma_{\Delta Kt}^2$) have been determined for each of several representative locations within the fleet region. These values may have been obtained from either ground-based point data or by converting satellite data from area into point statistics. If the fleet region is small, the variances calculated at each location i can be averaged to determine the average point variance across the fleet region. If there are N locations, then average variance of the clearness index across the photovoltaic fleet region is calculated as follows.

$$\sigma^2_{\overline{Kt}} = \sum_{i=1}^{N} \frac{\sigma^2_{Kt_i}}{N} \qquad (10)$$

Likewise, the variance of the clearness index change is calculated as follows.

$$\sigma^2_{\overline{\Delta Kt}} = \sum_{i=1}^{N} \frac{\sigma^2_{\Delta Kt_i}}{N} \qquad (11)$$

Calculate Fleet Power Statistics

The next step is to calculate photovoltaic fleet power statistics using the fleet irradiance statistics, as determined supra, and physical photovoltaic fleet configuration data. These fleet power statistics are derived from the irradiance statistics and have the same time period.

The critical photovoltaic fleet performance statistics that are of interest are the mean fleet power, the variance of the fleet power, and the variance of the change in fleet power over the desired time period. As in the case of irradiance statistics, the mean change in fleet power is assumed to be zero.

Photovoltaic System Power for Single System at Time t

Photovoltaic system power output (kW) is approximately linearly related to the AC-rating of the photovoltaic system (R in units of kW$_{AC}$) times plane-of-array irradiance. Plane-of-array irradiance can be represented by the clearness index over the photovoltaic system (KtPV) times the clear sky global horizontal irradiance times an orientation factor (O), which both converts global horizontal irradiance to plane-of-array irradiance and has an embedded factor that converts irradiance from Watts/m² to kW output/kW of rating. Thus, at a specific point in time (t), the power output for a single photovoltaic system (n) equals:

$$P_t^n = R^n O_t^n KtPV_t^n I_t^{Clear,n} \qquad (12)$$

The change in power equals the difference in power at two different points in time.

$$\Delta P_{t,\Delta t}^n = R^n O_{t+\Delta t}^n KtPV_{t+\Delta t}^n I_{t+\Delta t}^{Clear,n} - R^n O_t^n KtPV_t^n I_t^{Clear,n} \qquad (13)$$

The rating is constant, and over a short time interval, the two clear sky plane-of-array irradiances are approximately the same ($O_{t+\Delta t}^n I_{t+\Delta t}^{Clear,n} \approx O_t^n I_t^{Clear,n}$), so that the three terms can be factored out and the change in the clearness index remains.

$$\Delta P_{t,\Delta t}^n \approx R^n O_t^n I_t^{Clear,n} \Delta KtPV_t^n \qquad (14)$$

Time Series Photovoltaic Power for Single System $P^n$ is a random variable that summarizes the power for a single photovoltaic system n over a set of times for a given time interval and set of time periods. $\Delta P^n$ is a random variable that summarizes the change in power over the same set of times.

Mean Fleet Power ($\mu_P$)

The mean power for the fleet of photovoltaic systems over the time period equals the expected value of the sum of the power output from all of the photovoltaic systems in the fleet.

$$\mu_P = E\left[\sum_{n=1}^{N} R^n O^n KtPV^n I^{Clear,n}\right] \qquad (15)$$

If the time period is short and the region small, the clear sky irradiance does not change much and can be factored out of the expectation.

$$\mu_P = \mu_{I^{Clear}} E\left[\sum_{n=1}^{N} R^n O^n KtPV^n\right] \qquad (16)$$

Again, if the time period is short and the region small, the clearness index can be averaged across the photovoltaic fleet region and any given orientation factor can be assumed to be a constant within the time period. The result is that:

$$\mu_P = R^{Adj.Fleet} \mu_{I^{Clear}} \mu_{\overline{Kt}} \qquad (17)$$

where $\mu_{I^{Clear}}$ is calculated, $\mu_{\overline{Kt}}$ is taken from Equation (1) and:

$$R^{Adj.Fleet} = \sum_{n=1}^{N} R^n O^n \qquad (18)$$

This value can also be expressed as the average power during clear sky conditions times the average clearness index across the region.

$$\mu_P = \mu_P^{Clear} \mu_{\overline{Kt}} \qquad (19)$$

Variance of Fleet Power ($\sigma_P^2$)

The variance of the power from the photovoltaic fleet equals:

$$\sigma_P^2 = VAR\left[\sum_{n=1}^{N} R^n O^n KTPV^n I^{Clear,n}\right] \qquad (20)$$

If the clear sky irradiance is the same for all systems, which will be the case when the region is small and the time period is short, then:

$$\sigma_P^2 = VAR\left[I^{Clear} \sum_{n=1}^{N} R^n O^n KtPV^n\right] \qquad (21)$$

The variance of a product of two independent random variables X, Y, that is, VAR[XY]) equals $E[X]^2 VAR[Y] + E[Y]^2 VAR[X] + VAR[X] VAR[Y]$. If the X random variable has a large mean and small variance relative to the other terms, then $VAR[XY] \approx E[X]^2 VAR[Y]$. Thus, the clear sky irradiance can be factored out of Equation (21) and can be written as:

$$\sigma_P^2 = (\mu_{I^{Clear}})^2 VAR\left[\sum_{n=1}^{N} R^n KtPV^n O^n\right] \qquad (22)$$

The variance of a sum equals the sum of the covariance matrix.

$$\sigma_P^2 = (\mu_{I^{Clear}})^2 \left(\sum_{i=1}^{N}\sum_{j=1}^{N} COV[R^i KtPV^i O^i, R^j KtPV^j O^j]\right) \qquad (23)$$

In addition, over a short time period, the factor to convert from clear sky GHI to clear sky POA does not vary much and becomes a constant. All four variables can be factored out of the covariance equation.

$$\sigma_P^2 = (\mu_{I^{Clear}})^2 \left(\sum_{i=1}^{N}\sum_{j=1}^{N} (R^i O^i)(R^j O^j) COV[KtPV^i, KtPV^j]\right) \qquad (24)$$

For any $i$ and $j$, $COV[KtPV^i, KtPV^j] = \sqrt{\sigma_{KtPV^i}^2 \sigma_{KtPV^j}^2}\, \rho^{Kt^i, Kt^j}$.

$$\sigma_P^2 = (\mu_{I^{Clear}})^2 \left(\sum_{i=1}^{N}\sum_{j=1}^{N} (R^i O^i)(R^j O^j)\sqrt{\sigma_{KtPV^i}^2 \sigma_{KtPV^j}^2}\, \rho^{Kt^i, Kt^j}\right) \qquad (25)$$

As discussed supra, the variance of the satellite data required a conversion from the satellite area, that is, the area covered by a pixel, to an average point within the satellite area. In the same way, assuming a uniform clearness index across the region of the photovoltaic plant, the variance of the clearness index across a region the size of the photovoltaic plant within the fleet also needs to be adjusted. The same approach that was used to adjust the satellite clearness index can be used to adjust the photovoltaic clearness index. Thus, each variance needs to be adjusted to reflect the area that the $i^{th}$ photovoltaic plant covers.

$$\sigma_{KtPV^i}^2 = A_{Kt}^i \sigma_{\overline{Kt}}^2 \qquad (26)$$

Substituting and then factoring the clearness index variance given the assumption that the average variance is constant across the region yields:

$$\sigma_P^2 = (R^{Adj.Fleet} \mu_{I^{Clear}})^2 P^{Kt} \sigma_{\overline{Kt}}^2 \qquad (27)$$

where the correlation matrix equals:

$$P^{Kt} = \frac{\sum_{i=1}^{N} \sum_{j=1}^{N} (R^i O^i A_{Kt}^i)(R^j O^j A_{Kt}^j) \rho^{Kt^i, Kt^j}}{\left(\sum_{n=1}^{N} R^n O^n\right)^2} \qquad (28)$$

$R^{Adj.Fleet} \mu_{I^{Clear}}$ in Equation (27) can be written as the power produced by the photovoltaic fleet under clear sky conditions, that is:

$$\sigma_P^2 = \mu_{pClear}^2 P^{Kt} \sigma_{\overline{Kt}}^2 \qquad (29)$$

If the region is large and the clearness index mean or variances vary substantially across the region, then the simplifications may not be able to be applied. Notwithstanding, if the simplification is inapplicable, the systems are likely located far enough away from each other, so as to be independent. In that case, the correlation coefficients between plants in different regions would be zero, so most of the terms in the summation are also zero and an inter-regional simplification can be made. The variance and mean then become the weighted average values based on regional photovoltaic capacity and orientation.

Discussion

In Equation (28), the correlation matrix term embeds the effect of intra-plant and inter-plant geographic diversification. The area-related terms (A) inside the summations reflect the intra-plant power smoothing that takes place in a large plant and may be calculated using the simplified relationship, as further discussed supra. These terms are then weighted by the effective plant output at the time, that is, the rating adjusted for orientation. The multiplication of these terms with the correlation coefficients reflects the inter-plant smoothing due to the separation of photovoltaic systems from one another.

Variance of Change in Fleet Power ($\sigma_{\Delta P}^2$)

A similar approach can be used to show that the variance of the change in power equals:

$$\sigma_{\Delta P}^2 = \mu_{pClear}^2 P^{\Delta Kt} \sigma_{\overline{Kt}}^2 \qquad (30)$$

where:

$$P^{\Delta Kt} = \frac{\sum_{i=1}^{N} \sum_{j=1}^{N} (R^i O^i A_{\Delta Kt}^i) \rho^{\Delta Kt^i, \Delta Kt^j}}{\left(\sum_{n=1}^{N} R^n O^n\right)^2} \qquad (31)$$

The determination of Equations (30) and (31) becomes computationally intensive as the network of points becomes large. For example, a network with 10,000 photovoltaic systems would require the computation of a correlation coefficient matrix with 100 million calculations. The computational burden can be reduced in two ways. First, many of the terms in the matrix are zero because the photovoltaic systems are located too far away from each other. Thus, the double summation portion of the calculation can be simplified to eliminate zero values based on distance between locations by construction of a grid of points. Second, once the simplification has been made, rather than calculating the matrix on-the-fly for every time period, the matrix can be calculated once at the beginning of the analysis for a variety of cloud speed conditions, and then the analysis would simply require a lookup of the appropriate value.

Time Lag Correlation Coefficient

The next step is to adjust the photovoltaic fleet power statistics from the input time interval to the desired output time interval. For example, the time series data may have been collected and stored every 60 seconds. The user of the results, however, may want to have photovoltaic fleet power statistics at a 10-second rate. This adjustment is made using the time lag correlation coefficient.

The time lag correlation coefficient reflects the relationship between fleet power and that same fleet power starting one time interval ($\Delta t$) later. Specifically, the time lag correlation coefficient is defined as follows:

$$\rho^{P, P^{\Delta t}} = \frac{COV[P, P^{\Delta t}]}{\sqrt{\sigma_P^2 \sigma_{P^{\Delta t}}^2}} \qquad (32)$$

The assumption that the mean clearness index change equals zero implies that $\sigma_{P^{\Delta t}}^2 = \sigma_P^2$. Given a non-zero variance of power, this assumption can also be used to show that $$\frac{COV[P, P^{\Delta t}]}{\sigma_P^2} = 1 - \frac{\sigma_{\Delta P}^2}{2\sigma_P^2}.$$

Therefore:

$$\rho^{P, P^{\Delta t}} = 1 - \frac{\sigma_{\Delta P}^2}{2\sigma_P^2} \qquad (33)$$

This relationship illustrates how the time lag correlation coefficient for the time interval associated with the data collection rate is completely defined in terms of fleet power statistics already calculated. A more detailed derivation is described infra.

Equation (33) can be stated completely in terms of the photovoltaic fleet configuration and the fleet region clearness index statistics by substituting Equations (29) and (30). Specifically, the time lag correlation coefficient can be stated entirely in terms of photovoltaic fleet configuration, the variance of the clearness index, and the variance of the change in the clearness index associated with the time increment of the input data.

$$\rho^{P, P^{\Delta t}} = 1 - \frac{P^{\Delta Kt} \sigma_{\Delta \overline{Kt}}^2}{2 P^{Kt} \sigma_{\overline{Kt}}^2} \qquad (34)$$

Generate High-Speed Time Series Photovoltaic Fleet Power

The final step is to generate high-speed time series photovoltaic fleet power data based on irradiance statistics, photovoltaic fleet configuration, and the time lag correlation coefficient. This step is to construct time series photovoltaic fleet production from statistical measures over the desired time period, for instance, at half-hour output intervals.

A joint probability distribution function is required for this step. The bivariate probability density function of two unit normal random variables (X and Y) with a correlation coefficient of ρ equals:

$$f(x, y) = \frac{1}{2\pi\sqrt{1-\rho^2}} \exp\left[-\frac{(x^2 + y^2 - 2\rho xy)}{2(1-\rho^2)}\right] \quad (35)$$

The single variable probability density function for a unit normal random variable X alone is $$f(x) = \frac{1}{\sqrt{2\pi}} \exp\left(-\frac{x^2}{2}\right).$$

In addition, a conditional distribution for y can be calculated based on a known x by dividing the bivariate probability density function by the single variable probability density (i.e., $$\left(\text{i.e., } f(y|x) = \frac{f(x, y)}{f(x)}\right).$$

Making the appropriate substitutions, the result is that the conditional distribution of y based on a known x equals:

$$f(y|x) = \frac{1}{\sqrt{2\pi}\sqrt{1-\rho^2}} \exp\left[-\frac{(y - \rho x)^2}{2(1-\rho^2)}\right] \quad (36)$$

Define a random variable $$Z = \frac{Y - \rho x}{\sqrt{1-\rho^2}}$$

and substitute into Equation (36). The result is that the conditional probability of z given a known x equals:

$$f(z|x) = \frac{1}{\sqrt{2\pi}} \exp\left(-\frac{z^2}{2}\right) \quad (37)$$

The cumulative distribution function for Z can be denoted by φ(z*) where z* represents a specific value for z. The result equals a probability (p) that ranges between 0 (when z*=−∞) and 1 (when z*=∞). The function represents the cumulative probability that any value of z is less than z*, as determined by a computer program or value lookup.

$$p = \phi(z^*) = \frac{1}{\sqrt{2\pi}} \int_{-\infty}^{z^*} \exp\left(-\frac{z^2}{2}\right) dz \quad (38)$$

Rather than selecting z*, however, a probability p falling between 0 and 1 can be selected and the corresponding z* that results in this probability found, which can be accomplished by taking the inverse of the cumulative distribution function.

$$\phi^{-1}(p) = z^* \quad (39)$$

Substituting back for z as defined above results in:

$$\phi^{-1}(p) = \frac{y - \rho x}{\sqrt{1-\rho^2}} \quad (40)$$

Now, let the random variables equal $$X = \frac{P - \mu_P}{\sigma_P} \text{ and } Y = \frac{P^{\Delta t} - \mu_{P^{\Delta t}}}{\sigma_{P^{\Delta t}}},$$

with the correlation coefficient being the time lag correlation coefficient between P and $P^{\Delta t}$ (i.e., let $\rho = \rho^{P,P^{\Delta t}}$). When Δt is small, then the mean and standard deviations for $P^{\Delta t}$ are approximately equal to the mean and standard deviation for P. Thus, Y can be restated as $$Y \approx \frac{P^{\Delta t} - \mu_P}{\sigma_P}.$$

Add a time subscript to all of the relevant data to represent a specific point in time and substitute x, y, and ρ into Equation (40).

$$\phi^{-1}(p) = \frac{\left(\frac{P^{\Delta t}_t - \mu_P}{\sigma_P}\right) - \rho^{P,P^{\Delta t}}\left(\frac{P_t - \mu_P}{\sigma_P}\right)}{\sqrt{1 - \rho^{P,P^{\Delta t}2}}} \quad (41)$$

The random variable $P^{\Delta t}$, however, is simply the random variable P shifted in time by a time interval of Δt. As a result, at any given time t, $P^{\Delta t}_t = P_{t+\Delta t}$. Make this substitution into Equation (41) and solve in terms of $P_{t+\Delta t}$.

$$P_{t+\Delta t} = \rho^{P,P^{\Delta t}} P_t + \left(1 - \rho^{P,P^{\Delta t}}\right)\mu_P + \sqrt{\sigma_P^2\left(1 - \rho^{P,P^{\Delta t}2}\right)}\,\phi^{-1}(p) \quad (42)$$

At any given time, photovoltaic fleet power equals photovoltaic fleet power under clear sky conditions times the average regional clearness index, that is, $P_t = P_t^{Clear} Kt_t$. In addition, over a short time period, $\mu_P \approx P_t^{Clear}\mu_{\overline{Kt}}$ and $\sigma_P^2 \approx (P_t^{Clear})^2 P^{Kt}\sigma_{\overline{Kt}}^2$. Substitute these three relationships into Equation (42) and factor out photovoltaic fleet power under clear sky conditions (($P_t^{Clear}$)) as common to all three terms.

$$P_{t+\Delta t} = P_t^{Clear}\left[\rho^{P,P^{\Delta t}} Kt_t + \left(1 - \rho^{P,P^{\Delta t}}\right)\mu_{\overline{Kt}} + \sqrt{P^{Kt}\sigma\frac{2}{Kt}\left(1 - \rho^{P,P^{\Delta t}2}\right)}\,\phi^{-1}(p_t)\right] \quad (43)$$

Equation (43) provides an iterative method to generate high-speed time series photovoltaic production data for a fleet of photovoltaic systems. At each time step (t+Δt), the power delivered by the fleet of photovoltaic systems ($P_{t+\Delta t}$) is calculated using input values from time step t. Thus, a time series of power outputs can be created. The inputs include:

$P_t^{Clear}$—photovoltaic fleet power during clear sky conditions calculated using a photovoltaic simulation program and clear sky irradiance.

$Kt_t$—average regional clearance index inferred based on $P_t$ calculated in time step t, that is, $$Kt_t = \frac{P_t}{P_t^{Clear}}.$$

$\mu_{\overline{Kt}}$—mean clearness index calculated using time series irradiance data and Equation (1).

$\sigma_{\overline{Kt}}^2$—variance of the clearness index calculated using time series irradiance data and Equation (10).

$\rho^{P,P^{\Delta t}}$—fleet configuration as reflected in the time lag correlation coefficient calculated using Equation (34). In turn, Equation (34), relies upon correlation coefficients from Equations (28) and (31). A method to obtain these correlation coefficients by empirical means is described in commonly-assigned U.S. Patent application, entitled "Computer-Implemented System and Method for Determining Point-To-Point Correlation Of Sky Clearness for Photovoltaic Power Generation Fleet Output Estimation," Ser. No. 13/190,435, filed Jul. 25, 2011, pending, and U.S. Patent application, entitled "Computer-Implemented System and Method for Estimating photovoltaic power generation for use in photovoltaic fleet operation," Ser. No. 13/190,449, filed Jul. 25, 2011, pending, the disclosure of which is incorporated by reference.

$P^{Kt}$—fleet configuration as reflected in the clearness index correlation coefficient matrix calculated using Equation (28) where, again, the correlation coefficients may be obtained using the empirical results as further described infra.

$\phi^{-1}(p_t)$—the inverse cumulative normal distribution function based on a random variable between 0 and 1.

Derivation of Empirical Models

The previous section developed the mathematical relationships used to calculate irradiance and power statistics for the region associated with a photovoltaic fleet. The relationships between Equations (8), (28), (31), and (34) depend upon the ability to obtain point-to-point correlation coefficients. This section presents empirically-derived models that can be used to determine the value of the coefficients for this purpose.

Figure 7A:
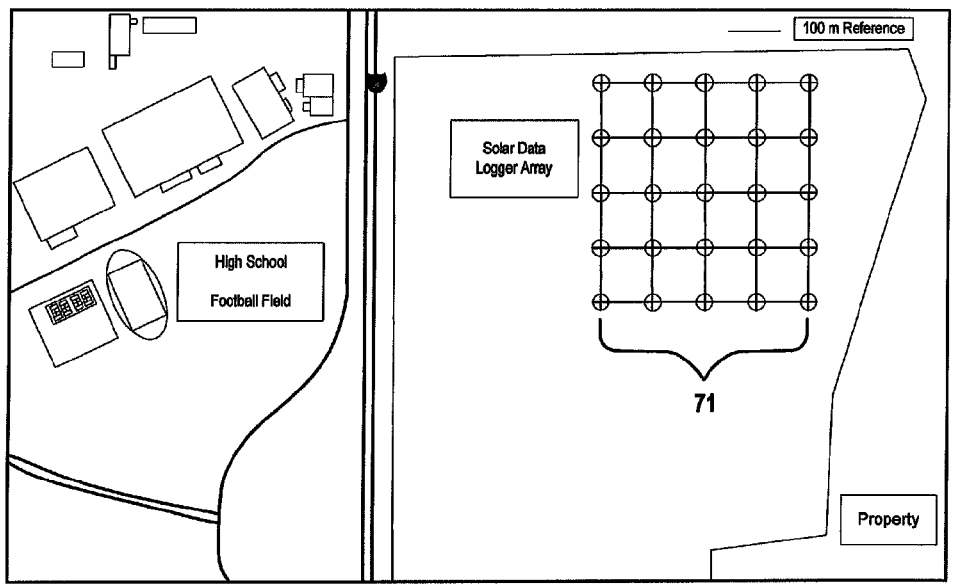
FIGS. 7A-7B are photographs showing, by way of example, the locations of the Cordelia Junction and Napa high density weather monitoring stations.
Figure 7B:
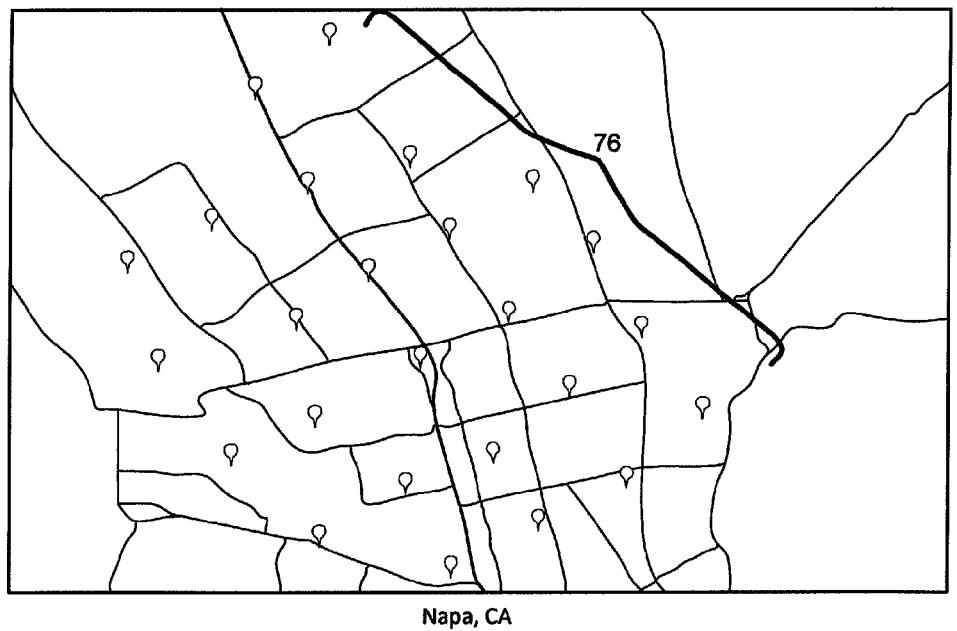

A mobile network of 25 weather monitoring devices was deployed in a 400 meter by 400 meter grid in Cordelia Junction, Calif., between Nov. 6, 2010, and Nov. 15, 2010, and in a 4,000 meter by 4,000 meter grid in Napa, Calif., between Nov. 19, 2010, and Nov. 24, 2010. FIGS. 7A-7B are photographs showing, by way of example, the locations of the Cordelia Junction and Napa high density weather monitoring stations.

An analysis was performed by examining results from Napa and Cordelia Junction using 10, 30, 60, 120 and 180 second time intervals over each half-hour time period in the data set. The variance of the clearness index and the variance of the change in clearness index were calculated for each of the 25 locations for each of the two networks. In addition, the clearness index correlation coefficient and the change in clearness index correlation coefficient for each of the 625 possible pairs, 300 of which are unique, for each of the two locations were calculated.

An empirical model is proposed as part of the methodology described herein to estimate the correlation coefficient of the clearness index and change in clearness index between any two points by using as inputs the following: distance between the two points, cloud speed, and time interval. For the analysis, distances were measured, cloud speed was implied, and a time interval was selected.

The empirical models infra describe correlation coefficients between two points (i and j), making use of "temporal distance," defined as the physical distance (meters) between points i and j, divided by the regional cloud speed (meters per second) and having units of seconds. The temporal distance answers the question, "How much time is needed to span two locations?"

Cloud speed was estimated to be six meters per second. Results indicate that the clearness index correlation coefficient between the two locations closely matches the estimated value as calculated using the following empirical model:

$$\rho^{Kt^i,Kt^j} = \exp(C_1 \times \text{TemporalDistance})^{ClearnessPower} \quad (44)$$

where TemporalDistance=Distance (meters)/CloudSpeed (meters per second), Clearness Power=$\ln(C_2\Delta t)-k$, such that $5 \leq k \leq 15$, where the expected value is k=9.3, $\Delta t$ is the desired output time interval (seconds), and $C_1 = 10^{-3}$ seconds$^{-1}$, and $C_2 = 1$ seconds$^{-1}$.

Results also indicate that the correlation coefficient for the change in clearness index between two locations closely matches the values calculated using the following empirical relationship:

$$\rho^{\Delta Kt^i,\Delta Kt^j} = (\rho^{Kt^i,Kt^j})^{\Delta ClearnessPower} \quad (45)$$

where $\rho^{Kt^i,Kt^j}$ is calculated using Equation (44) and $$\Delta ClearnessPower = 1 + \frac{m}{C_2 \Delta t},$$

such that $100 \leq m \leq 200$, where the expected value is m=140.

Empirical results also lead to the following models that may be used to translate the variance of clearness index and the variance of change in clearness index from the measured time interval ($\Delta t$ ref) to the desired output time interval ($\Delta t$).

$$\sigma_{Kt_{\Delta t}}^2 = \sigma_{Kt_{\Delta t\,ref}}^2 \exp\left[1 - \left(\frac{\Delta t}{\Delta t\,ref}\right)^{C_3}\right] \quad (46)$$

$$\sigma_{\Delta Kt_{\Delta t}}^2 = \sigma_{\Delta Kt_{\Delta t\,ref}}^2 \left\{1 - 2\left[1 - \left(\frac{\Delta t}{\Delta t\,ref}\right)^{C_3}\right]\right\} \quad (47)$$

where $C_3 = 0.1 \leq C_3 \leq 0.2$, where the expected value is $C_3 = 0.15$.

Figure 8A:
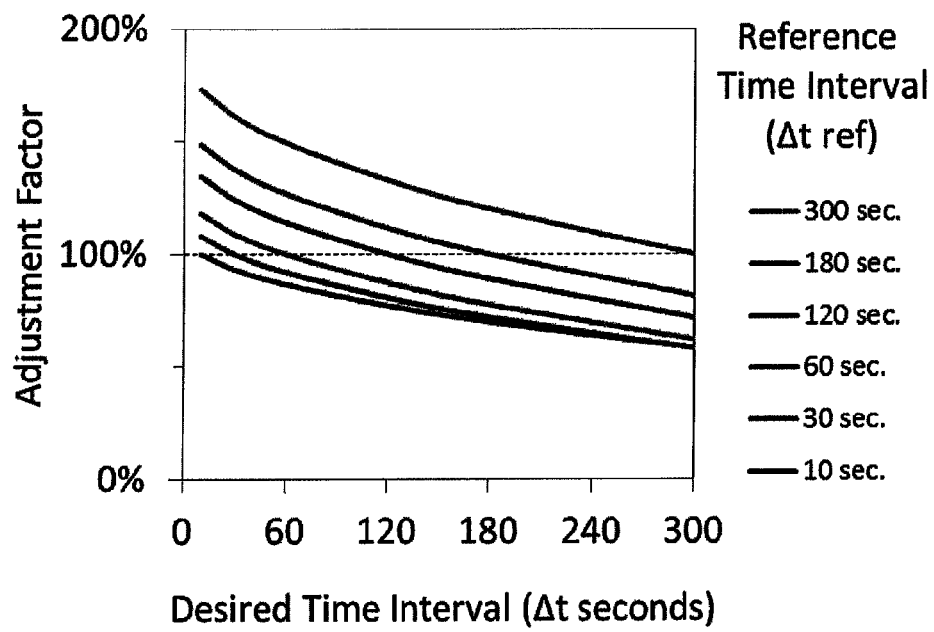
FIGS. 8A-8B are graphs depicting, by way of example, the adjustment factors plotted for time intervals from 10 seconds to 300 seconds.
Figure 8B:
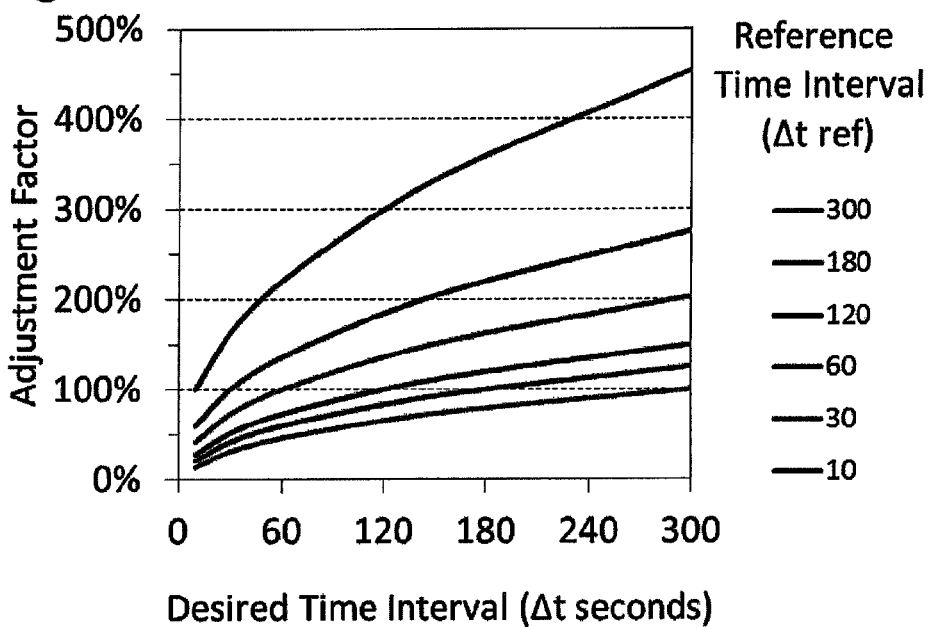
Figure 9A:
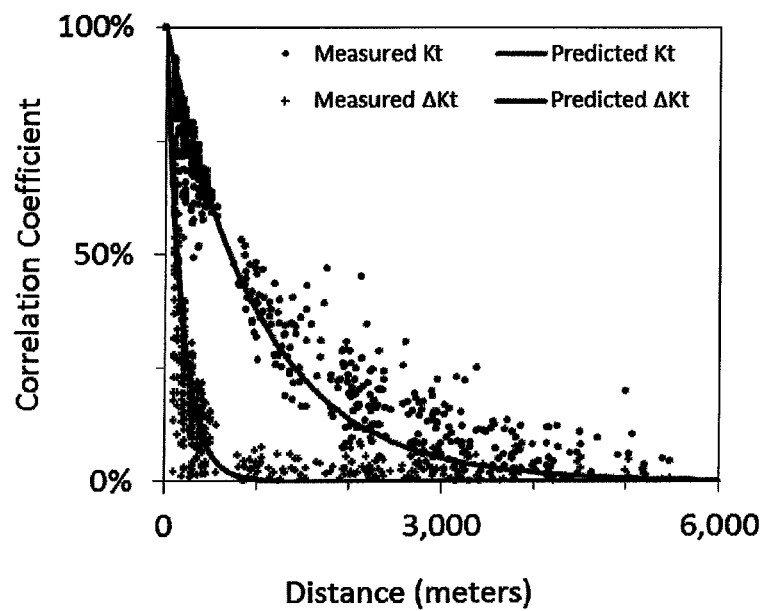
FIGS. 9A-9F are graphs depicting, by way of example, the measured and predicted weighted average correlation coefficients for each pair of locations versus distance.
Figure 9B:
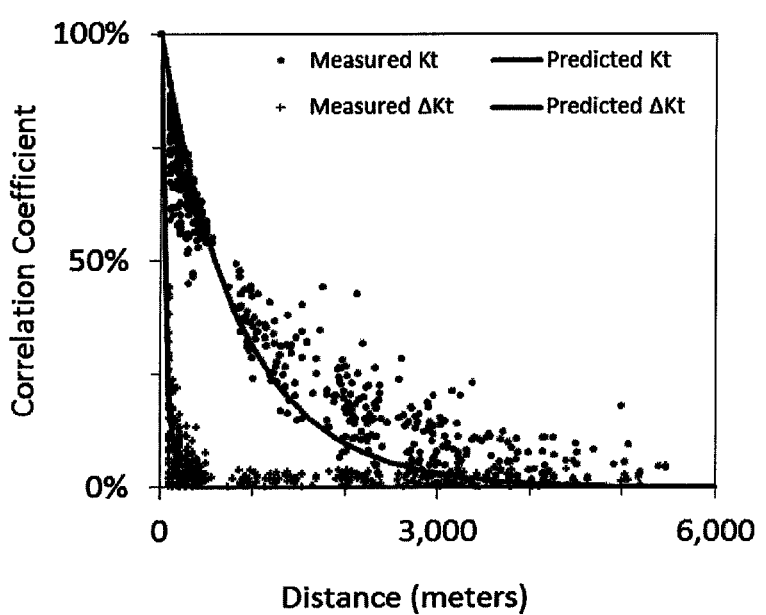
Figure 9C:
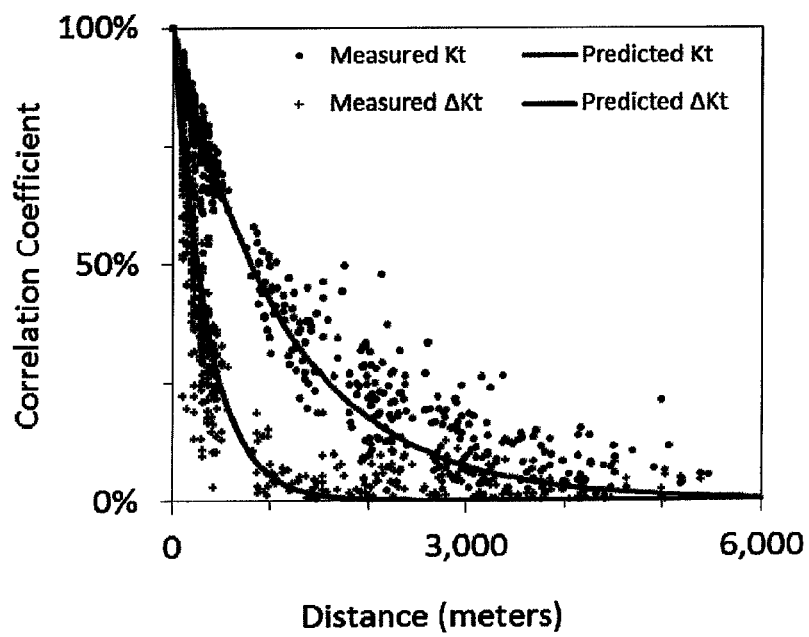
Figure 9D:
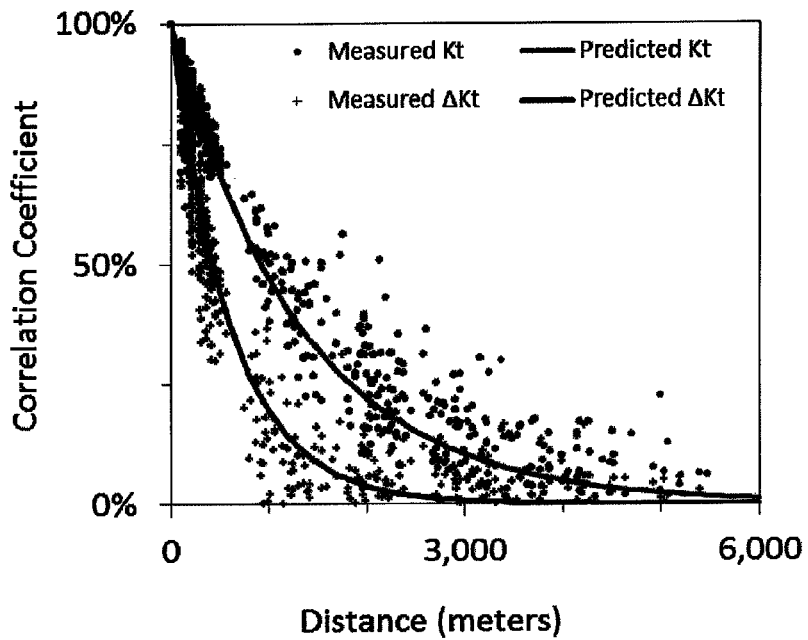
Figure 9E:
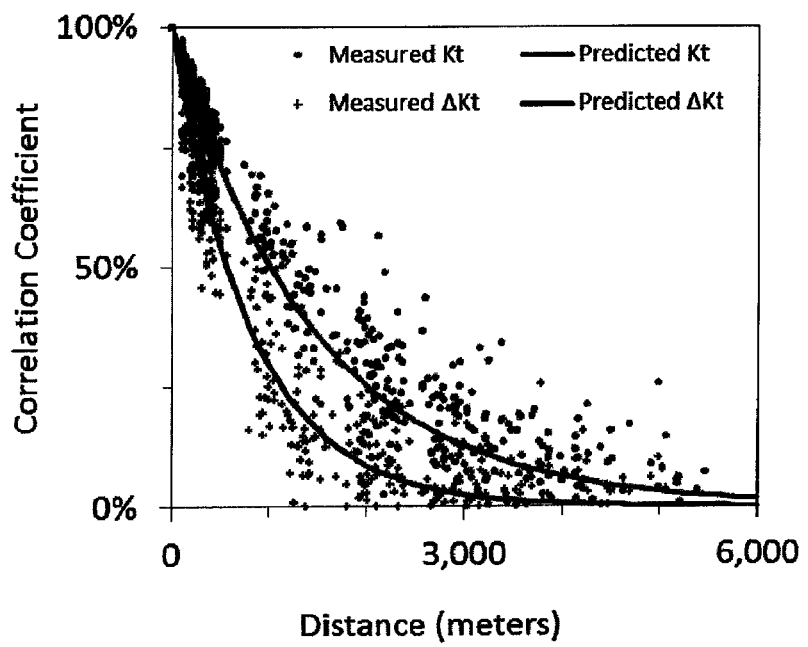
Figure 9F:
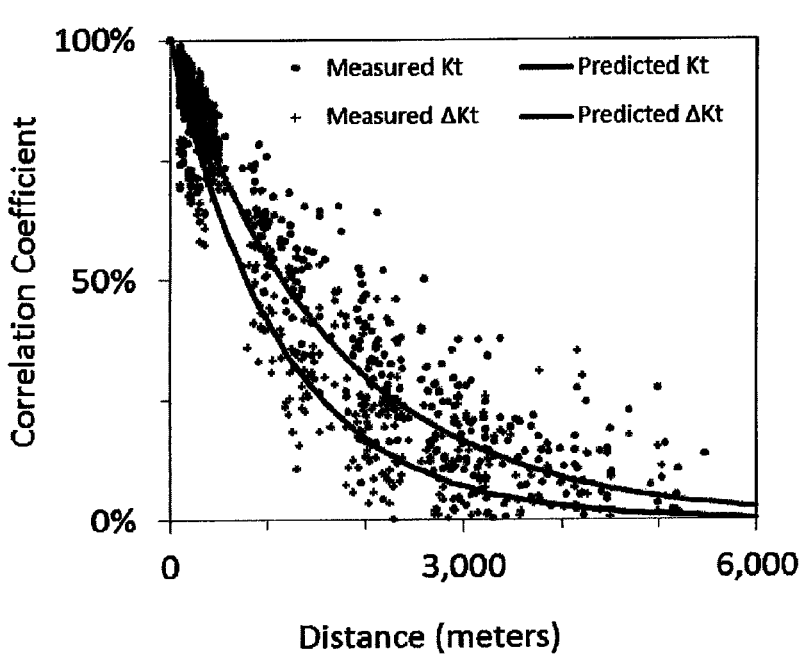
Figure 10A:
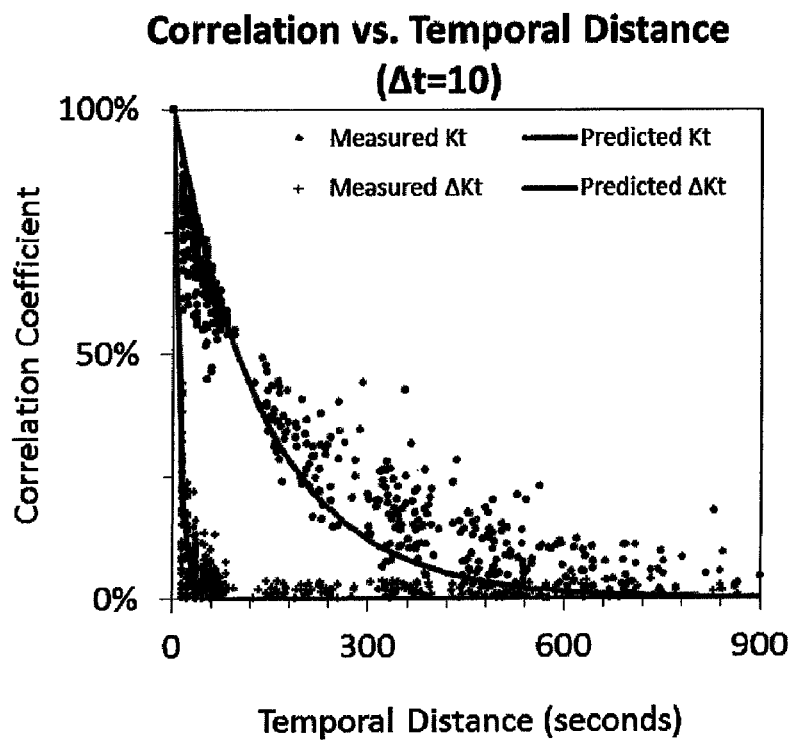
FIGS. 10A-10F are graphs depicting, by way of example, the same information as depicted in FIGS. 9A-9F versus temporal distance.
Figure 10B:
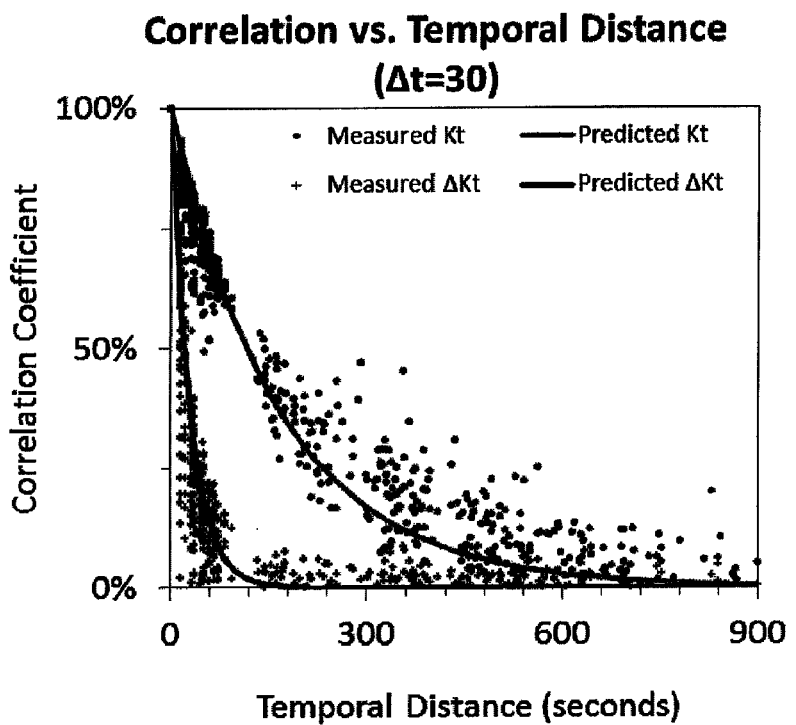
Figure 10C:
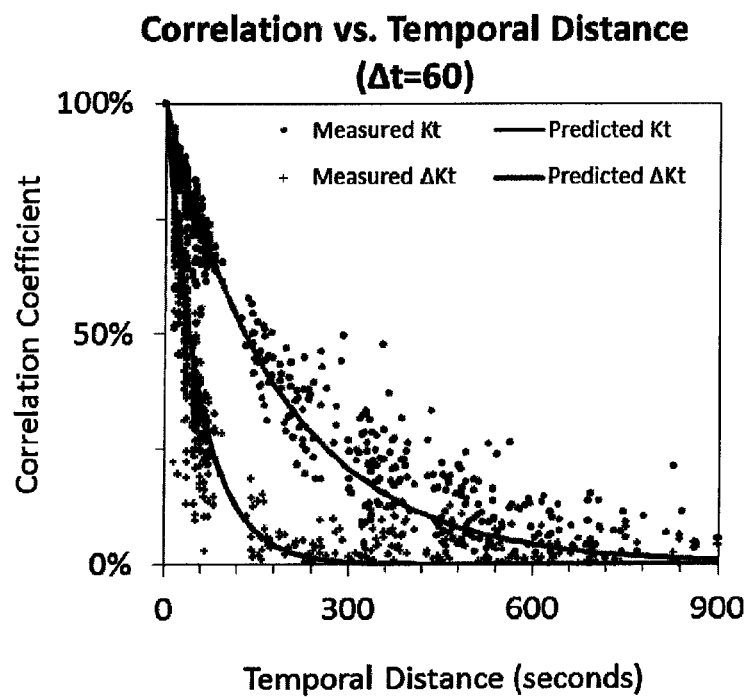
Figure 10D:
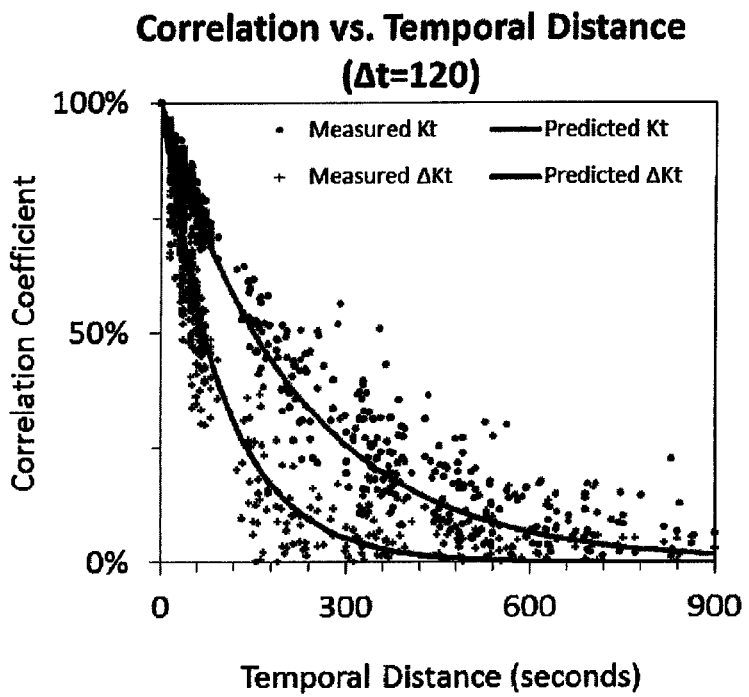
Figure 10E:
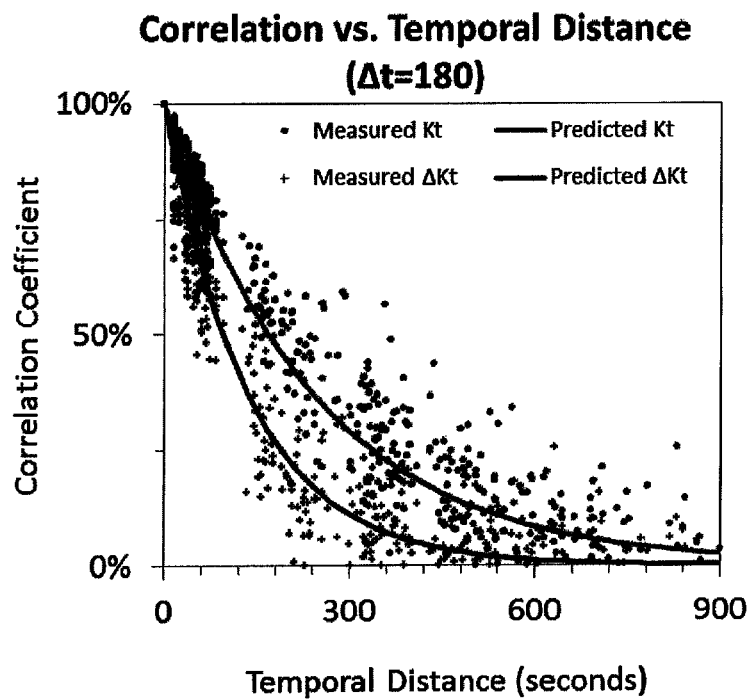
Figure 10F:
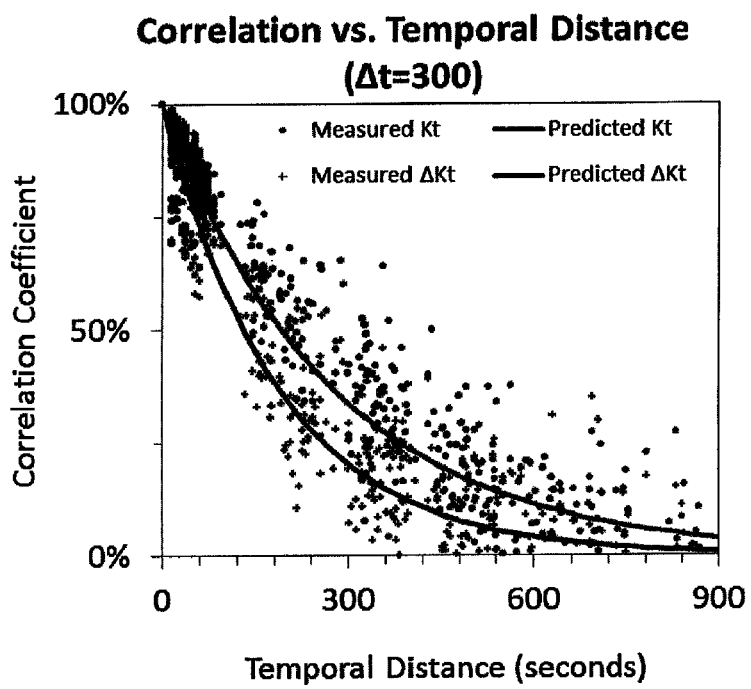
Figure 11A:
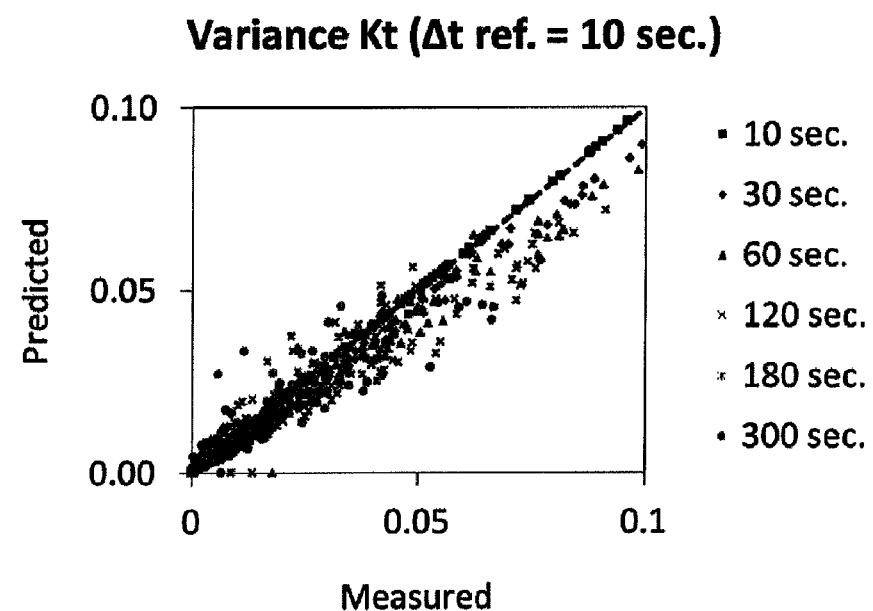
FIGS. 11A-11F are graphs depicting, by way of example, the predicted versus the measured variances of clearness indexes using different reference time intervals.
Figure 11B:
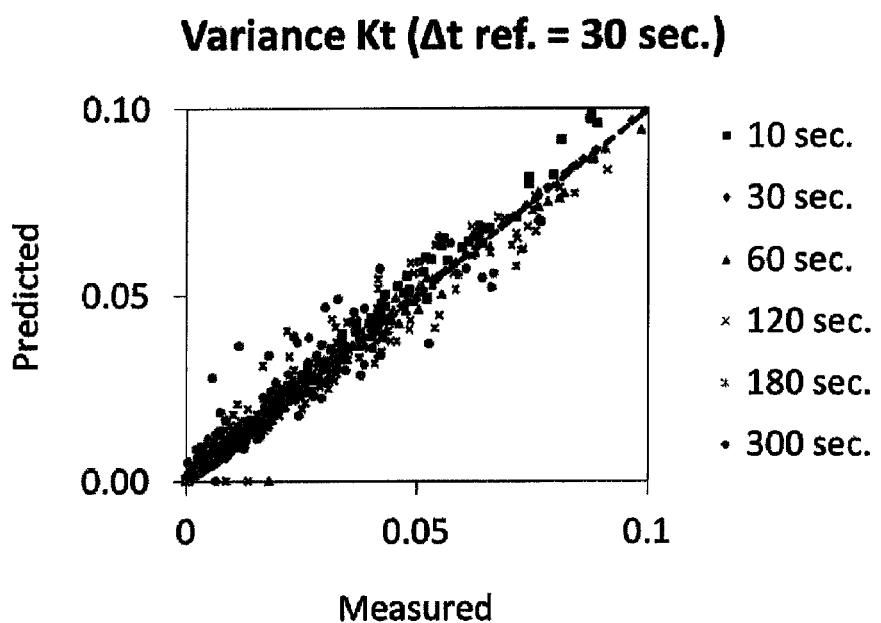
Figure 11C:
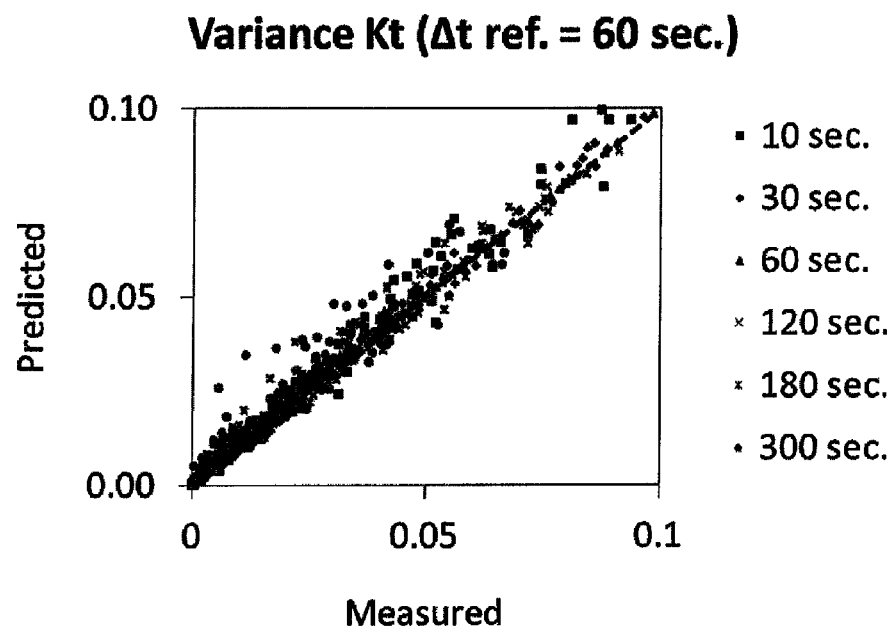
Figure 11D:
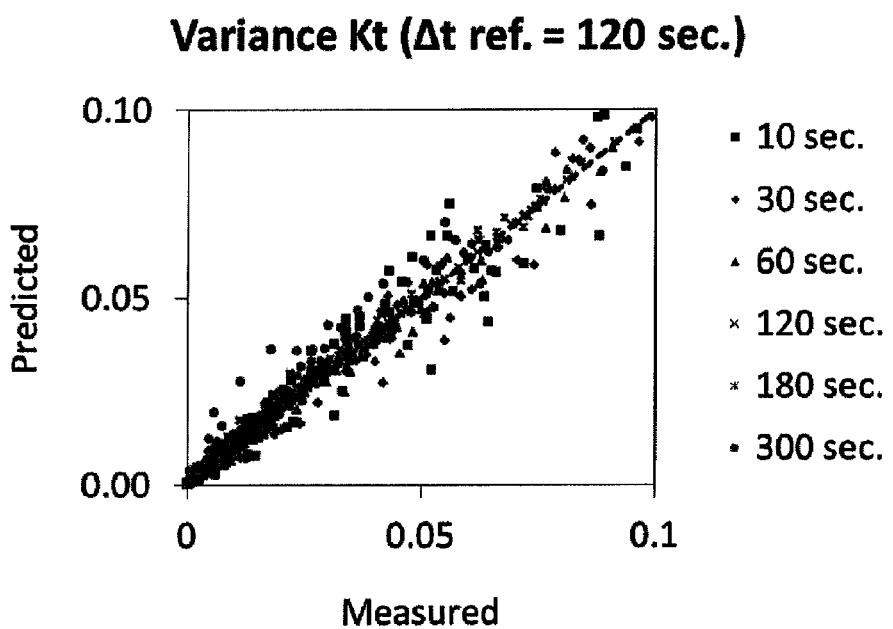
Figure 11E:
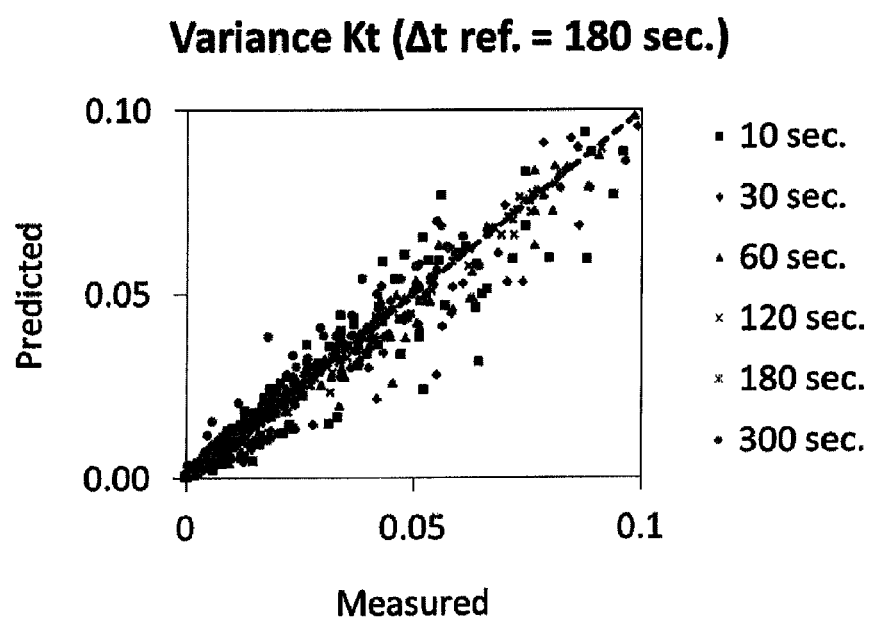
Figure 11F:
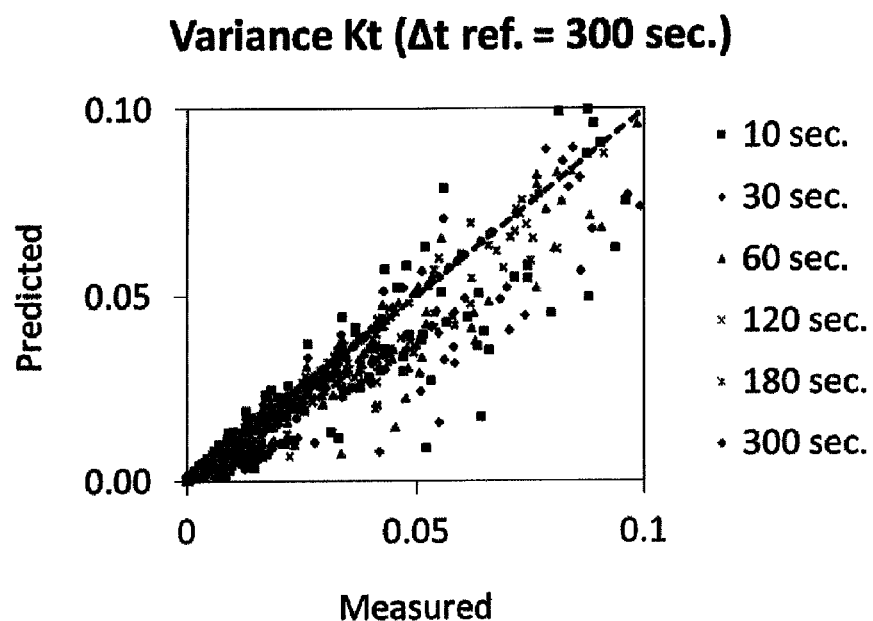
Figure 12A:
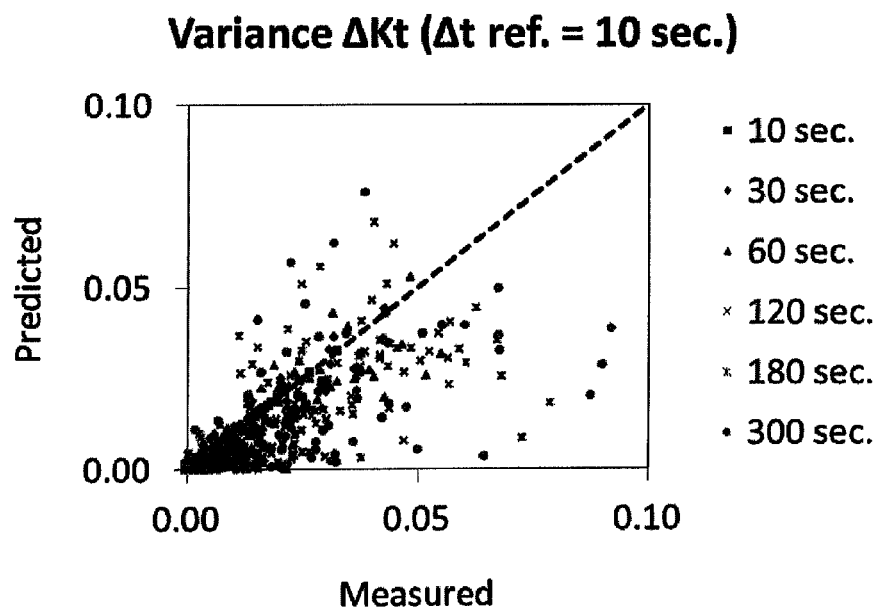
FIGS. 12A-12F are graphs depicting, by way of example, the predicted versus the measured variances of change in clearness indexes using different reference time intervals.
Figure 12B:
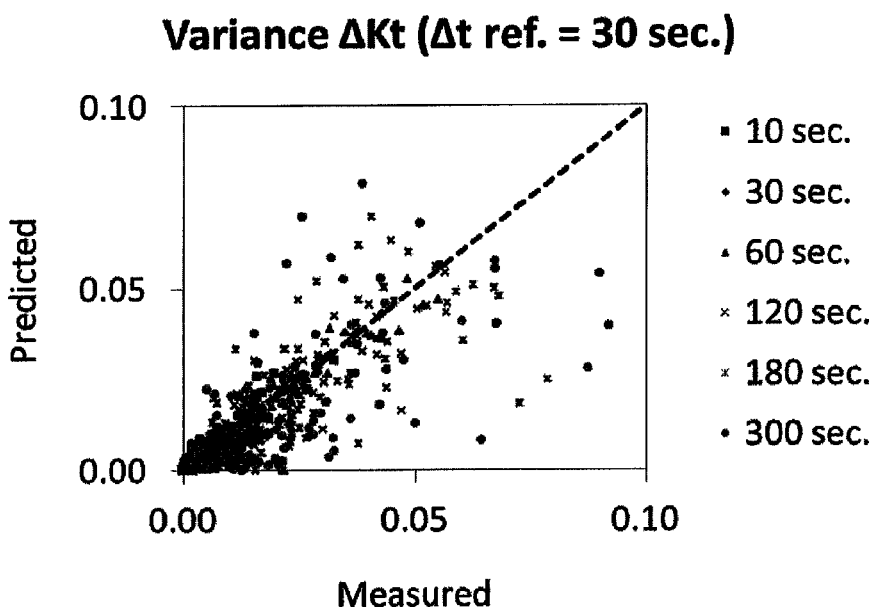
Figure 12C:
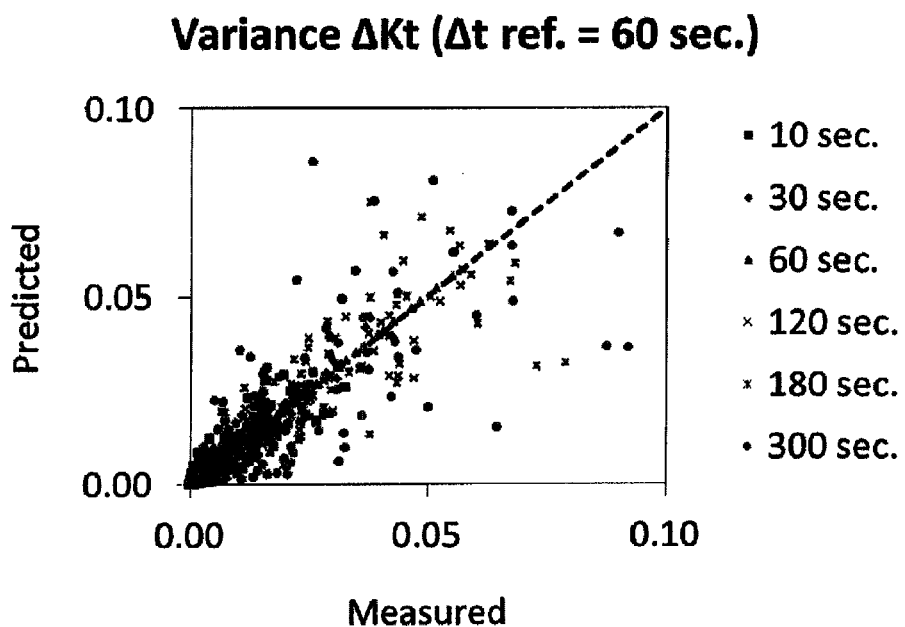
Figure 12D:
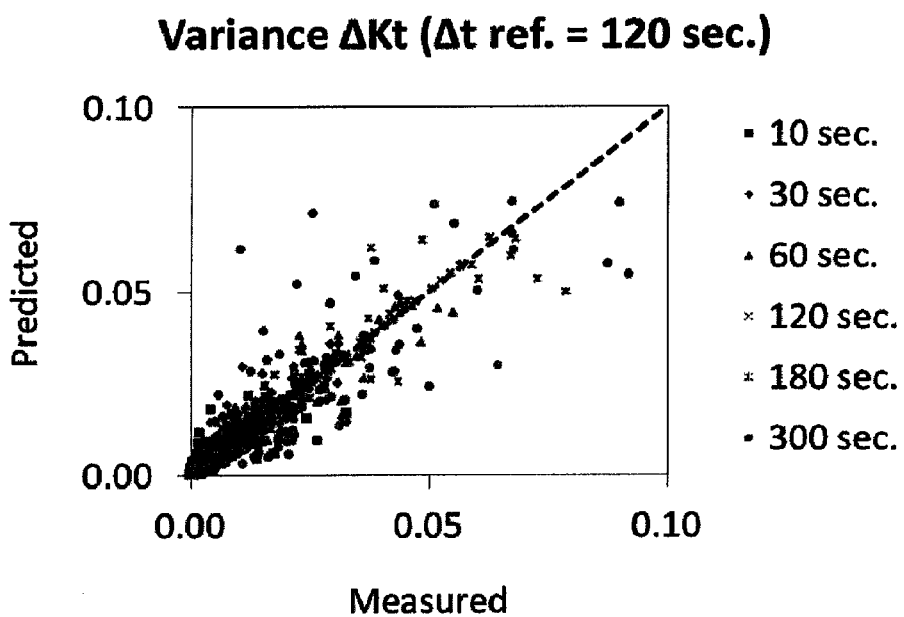
Figure 12E:
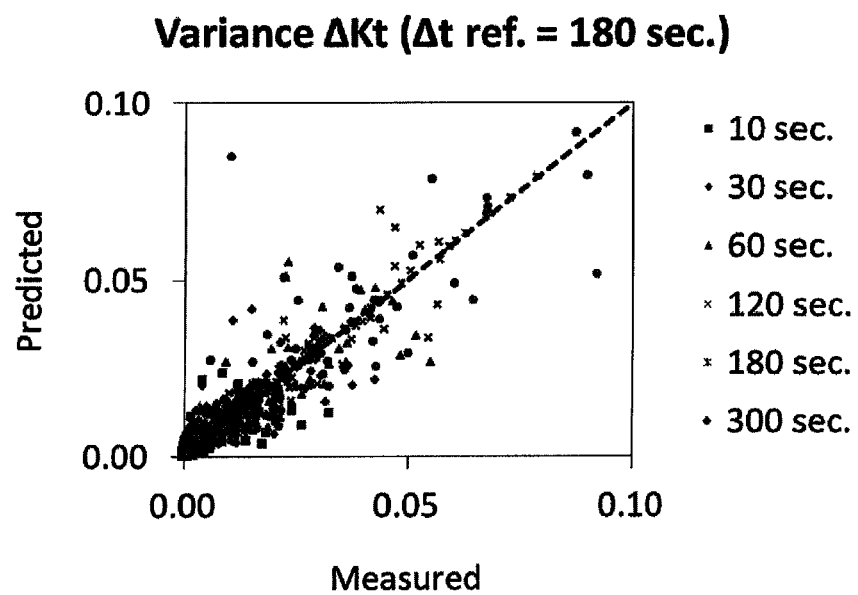
Figure 12F:
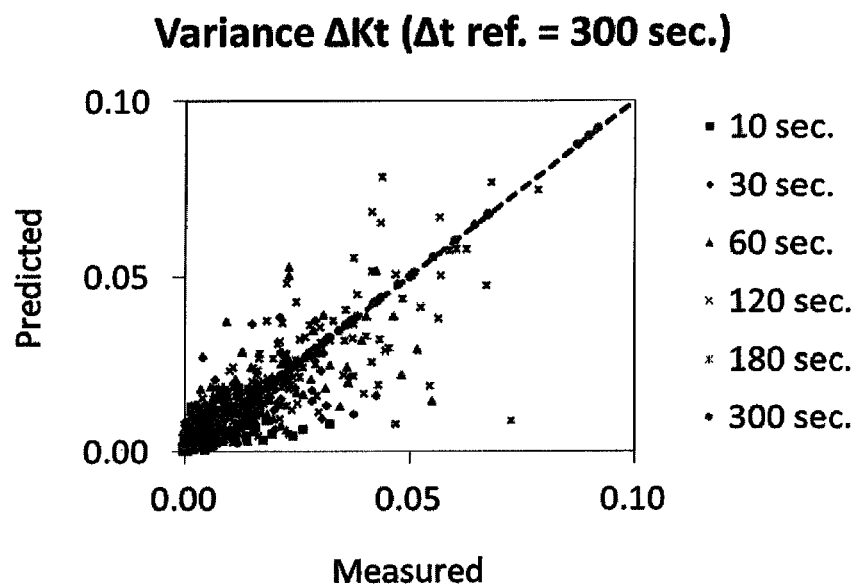

FIGS. 8A-8B are graphs depicting, by way of example, the adjustment factors plotted for time intervals from 10 seconds to 300 seconds. For example, if the variance is calculated at a 300-second time interval and the user desires results at a 10-second time interval, the adjustment for the variance clearness index would be 1.49

These empirical models represent a valuable means to rapidly calculate correlation coefficients and translate time interval with readily-available information, which avoids the use of computation-intensive calculations and high-speed streams of data from many point sources, as would otherwise be required.

Validation

Equations (44) and (45) were validated by calculating the correlation coefficients for every pair of locations in the Cordelia Junction network and the Napa network at half-hour time periods. The correlation coefficients for each time period were then weighted by the corresponding variance of that location and time period to determine weighted average correlation coefficient for each location pair. The weighting was performed as follows:

$$\overline{\rho^{Kt^i,Kt^j}} = \frac{\sum_{t=1}^{T} \sigma^2_{Kt-i,j_t} \rho^{Kt^i,Kt^j}{}_t}{\sum_{t=1}^{T} \sigma^2_{Kt-i,j_t}},$$

and $$\overline{\rho^{\Delta Kt^i,\Delta Kt^j}} = \frac{\sum_{t=1}^{T} \sigma^2_{\Delta Kt-i,j_t} \rho^{\Delta Kt^i,\Delta Kt^j}{}_t}{\sum_{t=1}^{T} \sigma^2_{\Delta Kt-i,j_t}}.$$

FIGS. 9A-9F are graphs depicting, by way of example, the measured and predicted weighted average correlation coefficients for each pair of locations versus distance. FIGS. 10A-10F are graphs depicting, by way of example, the same information as depicted in FIGS. 9A-9F versus temporal distance, based on the assumption that cloud speed was 6 meters per second. The upper line and dots appearing in close proximity to the upper line present the clearness index and the lower line and dots appearing in close proximity to the lower line present the change in clearness index for time intervals from 10 seconds to 5 minutes. The symbols are the measured results and the lines are the predicted results.

Several observations can be drawn based on the information provided by the FIGS. 9A-9F and 10A-10F. First, for a given time interval, the correlation coefficients for both the clearness index and the change in the clearness index follow an exponential decline pattern versus distance (and temporal distance). Second, the predicted results are a good representation of the measured results for both the correlation coefficients and the variances, even though the results are for two separate networks that vary in size by a factor of 100. Third, the change in the clearness index correlation coefficient converges to the clearness correlation coefficient as the time interval increases. This convergence is predicted based on the form of the empirical model because ΔClearness Power approaches one as Δt becomes large.

Equation (46) and (47) were validated by calculating the average variance of the clearness index and the variance of the change in the clearness index across the 25 locations in each network for every half-hour time period. FIGS. 11A-11F are graphs depicting, by way of example, the predicted versus the measured variances of clearness indexes using different reference time intervals. FIGS. 12A-12F are graphs depicting, by way of example, the predicted versus the measured variances of change in clearness indexes using different reference time intervals. FIGS. 11A-11F and 12A-12F suggest that the predicted results are similar to the measured results.

Discussion

The point-to-point correlation coefficients calculated using the empirical forms described supra refer to the locations of specific photovoltaic power production sites. Importantly, note that the data used to calculate these coefficients was not obtained from time sequence measurements taken at the points themselves. Rather, the coefficients were calculated from fleet-level data (cloud speed), fixed fleet data (distances between points), and user-specified data (time interval).

The empirical relationships of the foregoing types of empirical relationships may be used to rapidly compute the coefficients that are then used in the fundamental mathematical relationships. The methodology does not require that these specific empirical models be used and improved models will become available in the future with additional data and analysis.

Example

This section provides a complete illustration of how to apply the methodology using data from the Napa network of 25 irradiance sensors on Nov. 21, 2010. In this example, the sensors served as proxies for an actual 1 kW photovoltaic fleet spread evenly over the geographical region as defined by the sensors. For comparison purposes, a direct measurement approach is used to determine the power of this fleet and the change in power, which is accomplished by adding up the 10-second output from each of the sensors and normalizing the output to a 1 kW system. FIGS. 13A-13F are graphs and a diagram depicting, by way of example, application of the methodology described herein to the Napa network.

Figure 13A:
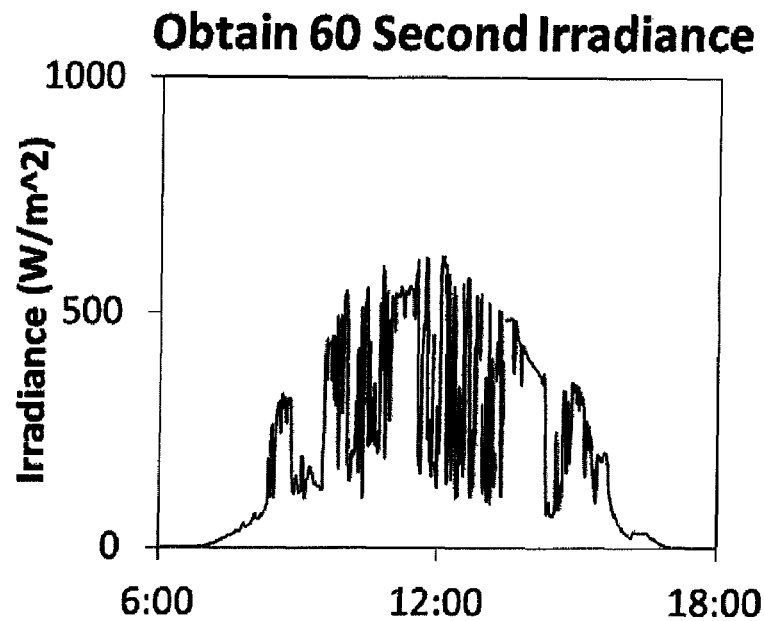
FIGS. 13A-13F are graphs and a diagram depicting, by way of example, application of the methodology described herein to the Napa network.
Figure 13B:
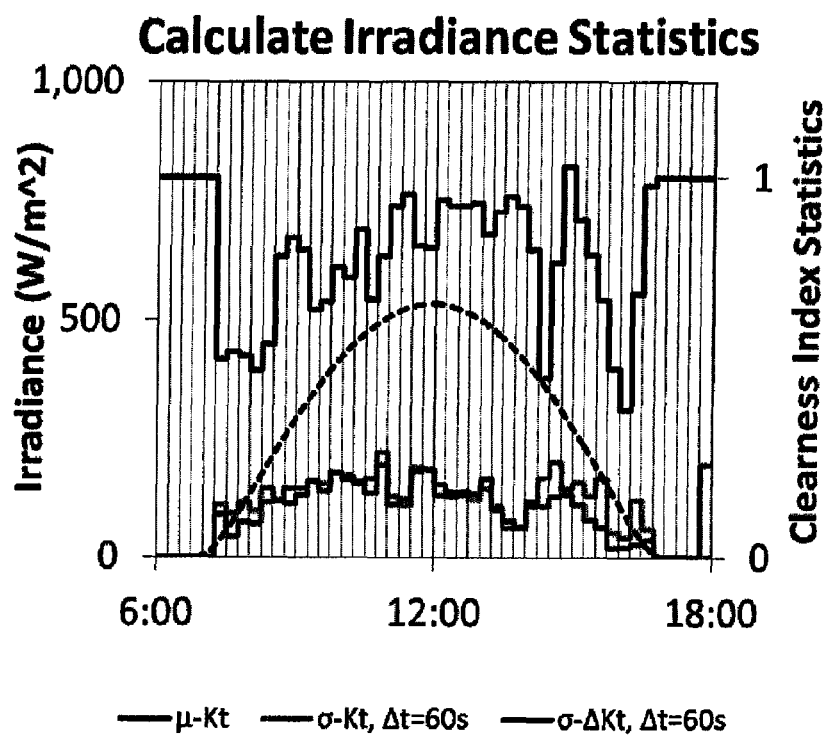
Figure 13C:
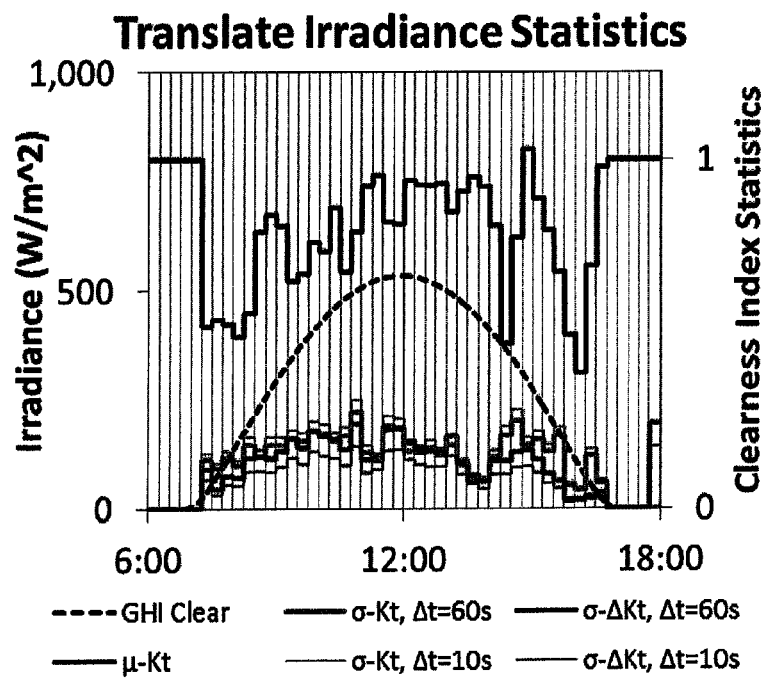
Figure 13D:
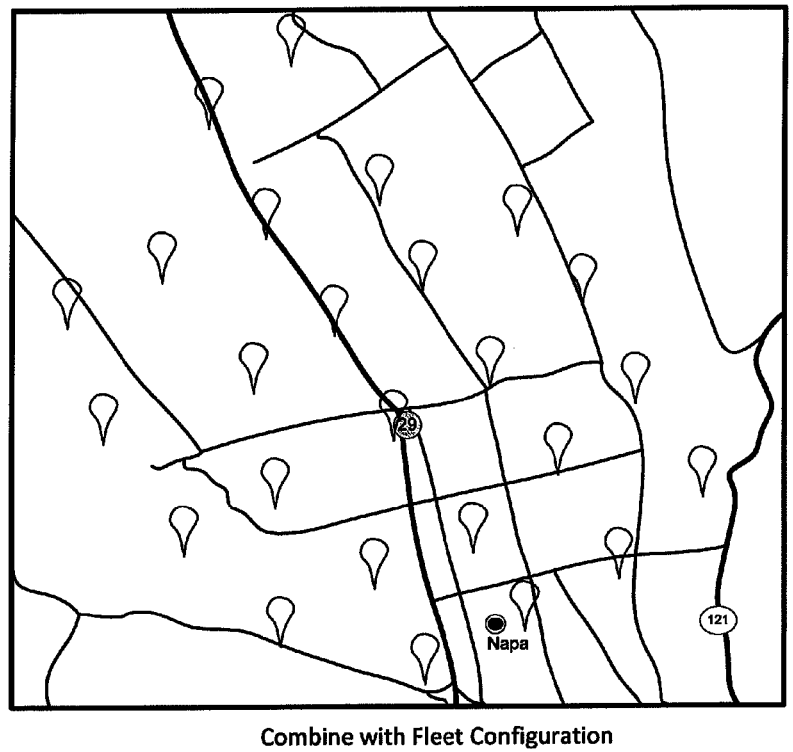
Figure 13E:
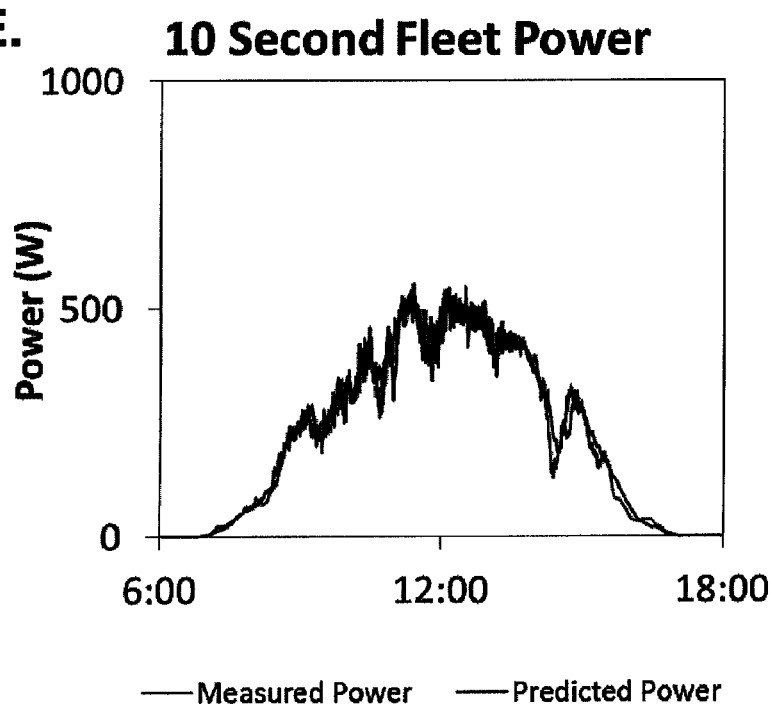
Figure 13F:
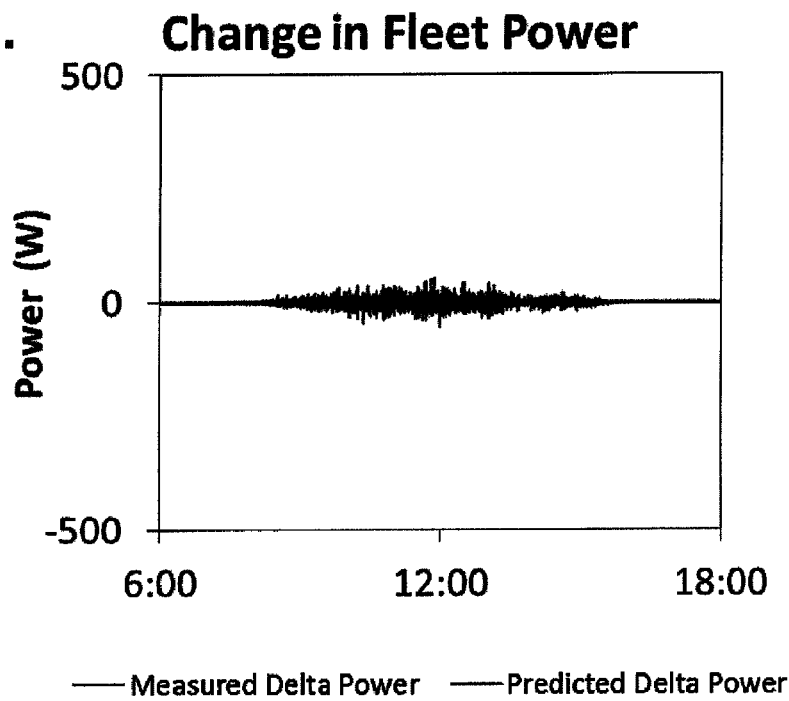

The predicted behavior of the hypothetical photovoltaic fleet was separately estimated using the steps of the methodology described supra. The irradiance data was measured using ground-based sensors, although other sources of data could be used, including from existing photovoltaic systems or satellite imagery. As shown in FIG. 13A, the data was collected on a day with highly variable clouds with one-minute global horizontal irradiance data collected at one of the 25 locations for the Napa network and specific 10-second measured power output represented by a blue line. This irradiance data was then converted from global horizontal irradiance to a clearness index. The mean clearness index, variance of clearness index, and variance of the change in clearness index was then calculated for every 15-minute period in the day. These calculations were performed for each of the 25 locations in the network. Satellite-based data or a statistically-significant subset of the ground measurement locations could have also served in place of the ground-based irradiance data. However, if the data had been collected from satellite regions, an additional translation from area statistics to average point statistics would have been required. The averaged irradiance statistics from Equations (1), (10), and (11) are shown in FIG. 13B, where standard deviation (a) is presented, instead of variance ($\sigma^2$) to plot each of these values in the same units.

In this example, the irradiance statistics need to be translated since the data were recorded at a time interval of 60 seconds, but the desired results are at a 10-second resolution. The translation was performed using Equations (46) and (47) and the result is presented in FIG. 13C.

The details of the photovoltaic fleet configuration were then obtained. The layout of the fleet is presented in FIG. 13D. The details include the location of the each photovoltaic system (latitude and longitude), photovoltaic system rating (1/25 kW), and system orientation (all are horizontal).

Equation (43), and its associated component equations, were used to generate the time series data for the photovoltaic fleet with the additional specification of the specific empirical models, as described in Equations (44) through (47). The resulting fleet power and change in power is presented represented by the red lines in FIGS. 12E and 12F.

Probability Density Function

The conversion from area statistics to point statistics relied upon two terms $A_{Kt}$ and $A_{\Delta Kt}$ to calculate and $\sigma_{Kt}^2$ and $\sigma_{\Delta Kt}^2$, respectively. This section considers these terms in more detail. For simplicity, the methodology supra applies to both Kt and $\Delta$Kt, so this notation is dropped. Understand that the correlation coefficient $\rho^{i,j}$ could refer to either the correlation coefficient for clearness index or the correlation coefficient for the change in clearness index, depending upon context. Thus, the problem at hand is to evaluate the following relationship:

$$A = \left(\frac{1}{N^2}\right)\sum_{i=1}^{N}\sum_{j=1}^{N} \rho^{i,j} \qquad (48)$$

The computational effort required to calculate the correlation coefficient matrix can be substantial. For example, suppose that the one wants to evaluate variance of the sum of points within a 1 square kilometer satellite region by breaking the region into one million square meters (1,000 meters by 1,000 meters). The complete calculation of this matrix requires the examination of 1 trillion ($10^{12}$) location pair combinations.

Discrete Formulation

The calculation can be simplified using the observation that many of the terms in the correlation coefficient matrix are identical. For example, the covariance between any of the one million points and themselves is 1. This observation can be used to show that, in the case of a rectangular region that has dimension of H by W points (total of N) and the capacity is equal distributed across all parts of the region that:

$$\left(\frac{1}{N^2}\right)\sum_{i=1}^{N}\sum_{j=1}^{N} \rho^{i,j} = \left(\frac{1}{N^2}\right)\left[\begin{array}{c} \sum_{i=0}^{H-1}\sum_{j=0}^{i} 2^k[(H-i)(W-j)]\rho^d + \\ \sum_{i=0}^{W-1}\sum_{j=0}^{i} 2^k[(W-i)(H-j)]\rho^d \end{array}\right] \qquad (49)$$

where:
k=
−1, when i=0 and j=0
1, when j=0 or j=i
2, when 0<j<i

When the region is a square, a further simplification can be made.

$$\left(\frac{1}{N^2}\right)\sum_{i=1}^{N}\sum_{j=1}^{N} \rho^{i,j} = \qquad (50)$$

$$\left(\frac{1}{N^2}\right)\left[\sum_{i=0}^{\sqrt{N}-1}\sum_{j=0}^{i} 2^k(\sqrt{N}-i)(\sqrt{N}-j)\rho^d\right]$$

where:
k=
0, when i=0 and j=0
2, when j=0 or j=i, and
3, when 0≤j≤i $$d = \left(\sqrt{i^2+j^2}\right)\left(\frac{\sqrt{\text{Area}}}{\sqrt{N}-1}\right).$$

The benefit of Equation (50) is that there are $$\frac{N-\sqrt{N}}{2}$$

rather than $N^2$ unique combinations that need to be evaluated. In the example above, rather than requiring one trillion possible combinations, the calculation is reduced to one-half million possible combinations.

Continuous Formulation

Even given this simplification, however, the problem is still computationally daunting, especially if the computation needs to be performed repeatedly in the time series. Therefore, the problem can be restated as a continuous formulation in which case a proposed correlation function may be used to simplify the calculation. The only variable that changes in the correlation coefficient between any of the location pairs is the distance between the two locations; all other variables are the same for a given calculation. As a result, Equation (50) can be interpreted as the combination of two factors: the probability density function for a given distance occurring and the correlation coefficient at the specific distance.

Figure 14:
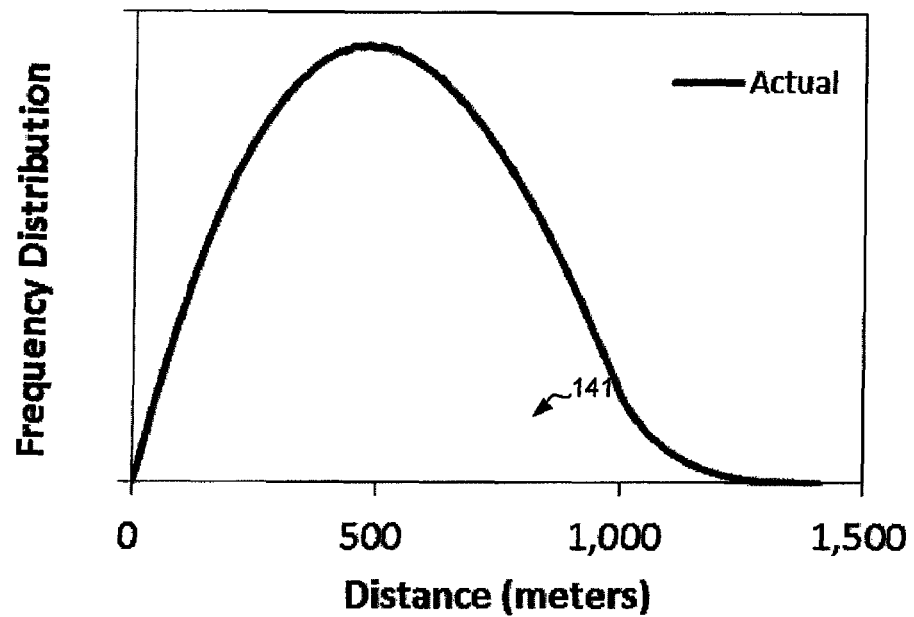
FIG. 14 is a graph depicting, by way of example, an actual probability distribution for a given distance between two pairs of locations, as calculated for a 1,000 meter×1,000 meter grid in one square meter increments.

Consider the probability density function. The actual probability of a given distance between two pairs occurring was calculated for a 1,000 meter×1,000 meter grid in one square meter increments. The evaluation of one trillion location pair combination possibilities was evaluated using Equation (48) and by eliminating the correlation coefficient from the equation. FIG. 14 is a graph depicting, by way of example, an actual probability distribution for a given distance between two pairs of locations, as calculated for a 1,000 meter×1,000 meter grid in one square meter increments.

The probability distribution suggests that a continuous approach can be taken, where the goal is to find the probability density function based on the distance, such that the integral of the probability density function times the correlation coefficient function equals:

$$A = \int f(D)\rho(d)dD \qquad (51)$$

An analysis of the shape of the curve shown in FIG. 14 suggests that the distribution can be approximated through the use of two probability density functions. The first probability density function is a quadratic function that is valid between 0 and $\sqrt{\text{Area}}$.

$$f_{Quad} = \begin{cases} \left(\frac{6}{\text{Area}}\right)\left(D - \frac{D^2}{\sqrt{\text{Area}}}\right) & \text{for } 0 \leq D \leq \sqrt{\text{Area}} \\ 0 & \text{for } D > \sqrt{\text{Area}} \end{cases} \qquad (52)$$

This function is a probability density function because integrating between 0 and $\sqrt{\text{Area}}$ equals 1 (i.e., $P[0 \leq D \leq \sqrt{\text{Area}}] = \int_0^{\sqrt{\text{Area}}} f_{Quad} dD = 1$).

The second function is a normal distribution with a mean of $\sqrt{\text{Area}}$ and standard deviation of $0.1\sqrt{\text{Area}}$.

$$f_{Norm} = \left(\frac{1}{0.1*\sqrt{Area}}\right)\left(\frac{1}{\sqrt{2\pi}}\right)e^{-\left(\frac{1}{2}\right)\left(\frac{D-\sqrt{Area}}{0.1*\sqrt{Area}}\right)^2} \quad (53)$$

Likewise, integrating across all values equals 1.

To construct the desired probability density function, take, for instance, 94 percent of the quadratic density function plus 6 of the normal density function.

$$f = 0.94 \int_0^{\sqrt{Area}} f_{Quad} dD + 0.06 \int_{-\infty}^{+\infty} f_{Norm} dD \quad (54)$$

Figure 15:
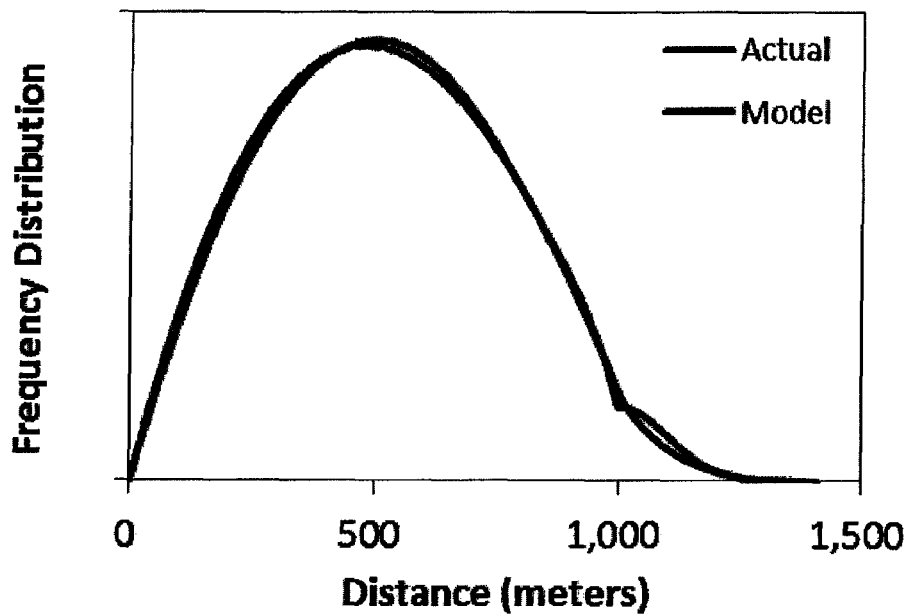
FIG. 15 is a graph depicting, by way of example, a matching of the resulting model to an actual distribution.

FIG. 15 is a graph depicting, by way of example, a matching of the resulting model to an actual distribution.

The result is that the correlation matrix of a square area with uniform point distribution as N gets large can be expressed as follows, first dropping the subscript on the variance since this equation will work for both Kt and 4Kt.

$$A \approx [0.94 \int_0^{\sqrt{Area}} f_{Quad} \rho(D) dD + 0.06 \int_{-\infty}^{+\infty} f_{Norm} \rho(D) dD] \quad (55)$$

where ρ(D) is a function that expresses the correlation coefficient as a function of distance (D).

Area to Point Conversion Using Exponential Correlation Coefficient

Equation (55) simplifies the problem of calculating the correlation coefficient and can be implemented numerically once the correlation coefficient function is known. This section demonstrates how a closed form solution can be provided, if the functional form of the correlation coefficient function is exponential.

Noting the empirical results as shown in the graph in FIGS. 9A-9F, an exponentially decaying function can be taken as a suitable form for the correlation coefficient function. Assume that the functional form of correlation coefficient function equals:

$$\rho(D) = e^{\frac{xD}{\sqrt{Area}}} \quad (56)$$

Let Quad be the solution to $\int_0^{\sqrt{Area}} f_{Quad} \rho(D) dD$.

$$Quad = \int_0^{\sqrt{Area}} f_{Quad} \rho(D) dD = \quad (57)$$

$$\left(\frac{6}{Area}\right) \int_0^{\sqrt{Area}} \left(D - \frac{D^2}{\sqrt{Area}}\right) \left[e^{\frac{xD}{\sqrt{Area}}}\right] dD$$

Integrate to solve.

$$Quad = (6)\left[\left(\frac{x}{\sqrt{Area}} D - 1\right) e^{\frac{xD}{\sqrt{Area}}} - \quad (58)\right.$$

$$\left.\left(\left(\frac{x}{\sqrt{Area}}\right)^2 D^2 - 2\frac{x}{\sqrt{Area}} D + 2\right) e^{\frac{xD}{\sqrt{Area}}}\right]$$

Complete the result by evaluating at D equal to $\sqrt{Area}$ for the upper bound and 0 for the lower bound. The result is:

$$Quad = \left(\frac{6}{x^3}\right)[(x-2)(e^x + 1) + 4] \quad (59)$$

Next, consider the solution to $\int_{-\infty}^{+\infty} f_{Norm} \rho^{(D)dD}$, which will be called Norm.

$$Norm = \left(\frac{1}{\sigma}\right)\left(\frac{1}{\sqrt{2\pi}}\right) \int_{-\infty}^{+\infty} e^{-\left(\frac{1}{2}\right)\left(\frac{D-\mu}{\sigma}\right)^2} e^{\frac{xD}{\sqrt{Area}}} dD \quad (60)$$

Where $\mu = \sqrt{Area}$ and $\sigma = 0.1\sqrt{Area}$. Simplifying:

$$Norm = \left[e^{\frac{x}{\sqrt{Area}}\left(\mu + \left(\frac{1}{2}\frac{x}{\sqrt{Area}}\right)\sigma^2\right)}\right]\left(\frac{1}{\sigma}\right). \quad (61)$$

$$\left(\frac{1}{\sqrt{2\pi}}\right) \int_{-\infty}^{+\infty} e^{-\left(\frac{1}{2}\right)\left[\frac{D-\left(\mu+\frac{x}{\sqrt{Area}}\sigma^2\right)}{\sigma}\right]^2} dD$$

Substitute $z = \dfrac{D - \left(\mu + \dfrac{x}{\sqrt{Area}} \sigma^2\right)}{\sigma}$ and $\sigma dz = dD$.

$$Norm = \left[e^{\frac{x}{\sqrt{Area}}\left(\mu + \left(\frac{1}{2}\frac{x}{\sqrt{Area}}\right)\sigma^2\right)}\right]\left(\frac{1}{\sqrt{2\pi}}\right) \int_{-\infty}^{+\infty} e^{-\left(\frac{1}{2}\right)z^2} dz \quad (62)$$

Integrate and solve.

$$Norm = e^{\frac{x}{\sqrt{Area}}\left(\mu + \left(\frac{1}{2}\frac{x}{\sqrt{Area}}\right)\sigma^2\right)} \quad (63)$$

Substitute the mean of $\sqrt{Area}$ and the standard deviation of $0.1\sqrt{Area}$ into Equation (63).

$$Norm = e^{x(1+0.005x)} \quad (64)$$

Substitute the solutions for Quad and Norm back into Equation (55). The result is the ratio of the area variance to the average point variance. This ratio was referred to as A (with the appropriate subscripts and superscripts) supra.

$$A = 0.94\left(\frac{6}{x^3}\right)[(x-2)(e^x + 1) + 4] + 0.06 e^{x(1+0.005x)} \quad (65)$$

Example

This section illustrates how to calculate A for the clearness index for a satellite pixel that covers a geographical surface area of 1 km by 1 km (total area of 1,000,000 m²), using a 60-second time interval, and 6 meter per second cloud speed. Equation (56) required that the correlation coefficient be of the form $$e^{\frac{xD}{\sqrt{Area}}}.$$

The empirically derived result in Equation (44) can be rearranged and the appropriate substitutions made to show that the correlation coefficient of the clearness index equals $$\exp\left[\frac{(\ln \Delta t - 9.3)D}{1000\, CloudSpeed}\right].$$

Multiply the exponent by $$\frac{\sqrt{Area}}{\sqrt{Area}},$$

so that the correlation coefficient equals $$\exp\left\{\left[\frac{(\ln \Delta t - 9.3)\sqrt{Area}}{1000\, CloudSpeed}\right]\left[\frac{D}{\sqrt{Area}}\right]\right\}.$$

This expression is now in the correct form to apply Equation (65), where $$x = \frac{(\ln \Delta t - 9.3)\sqrt{Area}}{1000\, CloudSpeed}.$$

Figure 16:
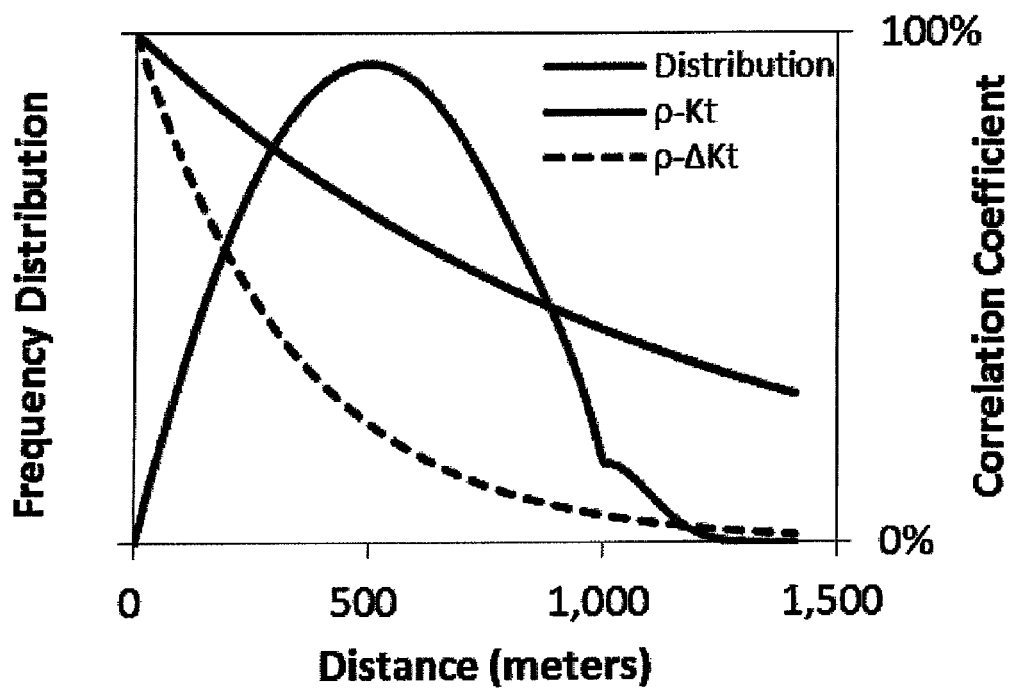
FIG. 16 is a graph depicting, by way of example, results generated by application of Equation (18).

Inserting the assumptions results in $$x = \frac{(\ln 60 - 9.3)\sqrt{1{,}000{,}000}}{1000 \times 6} = -0.86761,$$

which is applied to Equation (65). The result is that A equals 65 percent, that is, the variance of the clearness index of the satellite data collected over a 1 km² region corresponds to 65 percent of the variance when measured at a specific point. A similar approach can be used to show that the A equals 27 percent for the change in clearness index. FIG. 16 is a graph depicting, by way of example, results generated by application of Equation (65).

Time Lag Correlation Coefficient

This section presents an alternative approach to deriving the time lag correlation coefficient. The variance of the sum of the change in the clearness index equals:

$$\sigma^2_{\Sigma \Delta Kt} = VAR[\Sigma(Kt^{\Delta t} - Kt)] \tag{66}$$

where the summation is over N locations. This value and the corresponding subscripts have been excluded for purposes of notational simplicity.

Divide the summation into two parts and add several constants to the equation:

$$\sigma^2_{\Sigma \Delta Kt} = VAR\left[\sigma_{\Sigma Kt^{\Delta t}}\left(\frac{\Sigma Kt^{\Delta t}}{\sigma_{\Sigma Kt^{\Delta t}}}\right) - \sigma_{\Sigma Kt}\left(\frac{\Sigma Kt}{\sigma_{\Sigma Kt}}\right)\right] \tag{67}$$

Since $\sigma_{\Sigma Kt}^{\Delta t} \approx \sigma_{\Sigma Kt}$ (or $\sigma_{\Sigma Kt}^{\Delta t} = \sigma_{\Sigma Kt}$ if the first term in Kt and the last term in $Kt^{\Delta t}$ are the same):

$$\sigma^2_{\Sigma \Delta Kt} = \sigma^2_{\Sigma Kt} VAR\left[\frac{\Sigma Kt^{\Delta t}}{\sigma_{\Sigma Kt^{\Delta t}}} - \frac{\Sigma Kt}{\sigma_{\Sigma Kt}}\right] \tag{68}$$

The variance term can be expanded as follows:

$$\sigma^2_{\Sigma \Delta Kt} = \sigma^2_{\Sigma Kt}\left\{\frac{VAR[\Sigma Kt^{\Delta t}]}{\sigma^2_{\Sigma Kt^{\Delta t}}} + \frac{VAR[\Sigma Kt]}{\sigma^2_{\Sigma Kt}} - \frac{2COV[\Sigma Kt, \Sigma Kt^{\Delta t}]}{\sigma_{\Sigma Kt}\sigma_{\Sigma Kt^{\Delta t}}}\right\} \tag{69}$$

Since $COV[\Sigma Kt, \Sigma Kt^{\Delta t}] = \sigma_{\Sigma Kt}\sigma_{\Sigma Kt}^{\Delta t}\rho^{\Sigma Kt, \Sigma Kt^{\Delta t}}$, the first two terms equal one and the covariance term is replaced by the correlation coefficient.

$$\sigma_{\Sigma \Delta Kt}^2 = 2\sigma_{\Sigma Kt}^2(1 - \rho^{\Sigma Kt, \Sigma Kt^{\Delta t}})$$

This expression rearranges to:

$$\rho^{\Sigma Kt, \Sigma Kt^{\Delta t}} = 1 - \left(\frac{1}{2}\frac{\sigma^2_{\Delta Kt}}{\sigma^2_{Kt}}\right) \tag{71}$$

Assume that all photovoltaic plant ratings, orientations, and area adjustments equal to one, calculate statistics for the clearness alone using the equations described supra and then substitute. The result is:

$$\rho^{\Sigma Kt, \Sigma Kt^{\Delta t}} = 1 - \frac{P^{\Delta Kt}\sigma^2_{\Delta Kt}}{2P^{Kt}\sigma^2_{Kt}} \tag{72}$$

Relationship Between Time Lag Correlation Coefficient and Power/Change in Power Correlation Coefficient This section derives the relationship between the time lag correlation coefficient and the correlation between the series and the change in the series for a single location.

$$\rho^{P, \Delta P} = \frac{COV[P, \Delta P]}{\sqrt{\sigma^2_P \sigma^2_{\Delta P}}} = \frac{COV[P, P^{\Delta t} - P]}{\sqrt{\sigma^2_P \sigma^2_{\Delta P}}} = \frac{COV[P, P^{\Delta t}] - \sigma^2_P}{\sqrt{\sigma^2_P \sigma^2_{\Delta P}}}$$

Since $\sigma^2_{\Delta P} = VAR[P^{\Delta t} - P] = \sigma^2_P + \sigma^2_{P^{\Delta t}} - 2COV[P, P^{\Delta t}]$, and $COV[P, P^{\Delta t}] = \rho^{P, P^{\Delta t}}\sqrt{\sigma^2_P \sigma^2_{P^{\Delta t}}}$, then:

$$\rho^{P, \Delta P} = \frac{\rho^{P, P^{\Delta t}}\sqrt{\sigma^2_P \sigma^2_{P^{\Delta t}}} - \sigma^2_P}{\sqrt{\sigma^2_P(\sigma^2_P + \sigma^2_{P^{\Delta t}} - 2\rho^{P, P^{\Delta t}}\sqrt{\sigma^2_P \sigma^2_{P^{\Delta t}}})}}$$

Since $\sigma_P^2 \approx \sigma_{P^{\Delta t}}^2$, this expression can be further simplified. Then, square both expression and solve for the time lag correlation coefficient:

$$\rho^{P, P^{\Delta t}} = 1 - 2(\rho^{P, \Delta P})^2$$

Correlation Coefficients Between Two Regions

Assume that the two regions are squares of the same size, each side with N points, that is, a matrix with dimensions of √N by √N points, where is an integer, but are separated by one or more regions. Thus:

$$\sum_{i=1}^{N}\sum_{j=1}^{N}\left(\frac{1}{N^2}\right)\rho^{i,j} = \left(\frac{1}{N^2}\right)\left[\sum_{i=0}^{\sqrt{N}-1}\sum_{j=1-\sqrt{N}}^{\sqrt{N}-1} k(\sqrt{N}-i)(\sqrt{N}-|j|)\rho^d\right] \quad (73)$$

where:
k=
1 when i=0, and
2, when i>0, $$d = \left(\sqrt{i^2 + (j + M\sqrt{N})^2}\right)\left(\frac{\sqrt{Area}}{\sqrt{N-1}}\right),$$

and
such that M equals the number of regions.

Figure 17:
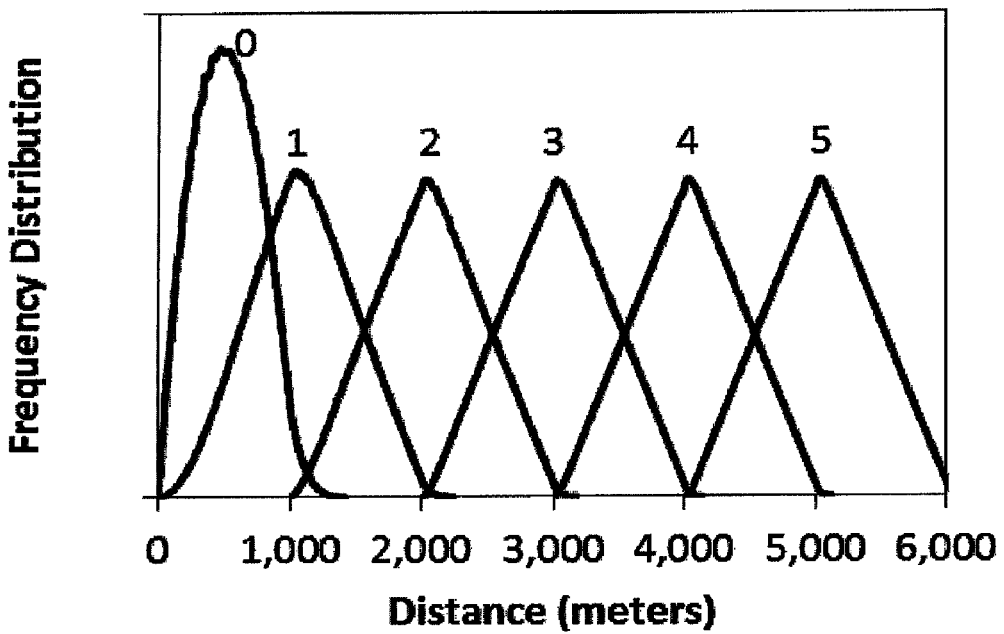
FIG. 17 is a graph depicting, by way of example, the probability density function when regions are spaced by zero to five regions.

FIG. 17 is a graph depicting, by way of example, the probability density function when regions are spaced by zero to five regions. FIG. 17 suggests that the probability density function can be estimated using the following distribution:

$$f = \begin{cases} 1 - \left(\frac{Spacing - D}{\sqrt{Area}}\right) & \text{for } Spacing - \sqrt{Area} \le D \le Spacing \\ 1 + \left(\frac{Spacing - D}{\sqrt{Area}}\right) & \text{for } Spacing \le D \le Spacing + \sqrt{Area} \\ 0 & \text{all else} \end{cases} \quad (74)$$

Figure 18:
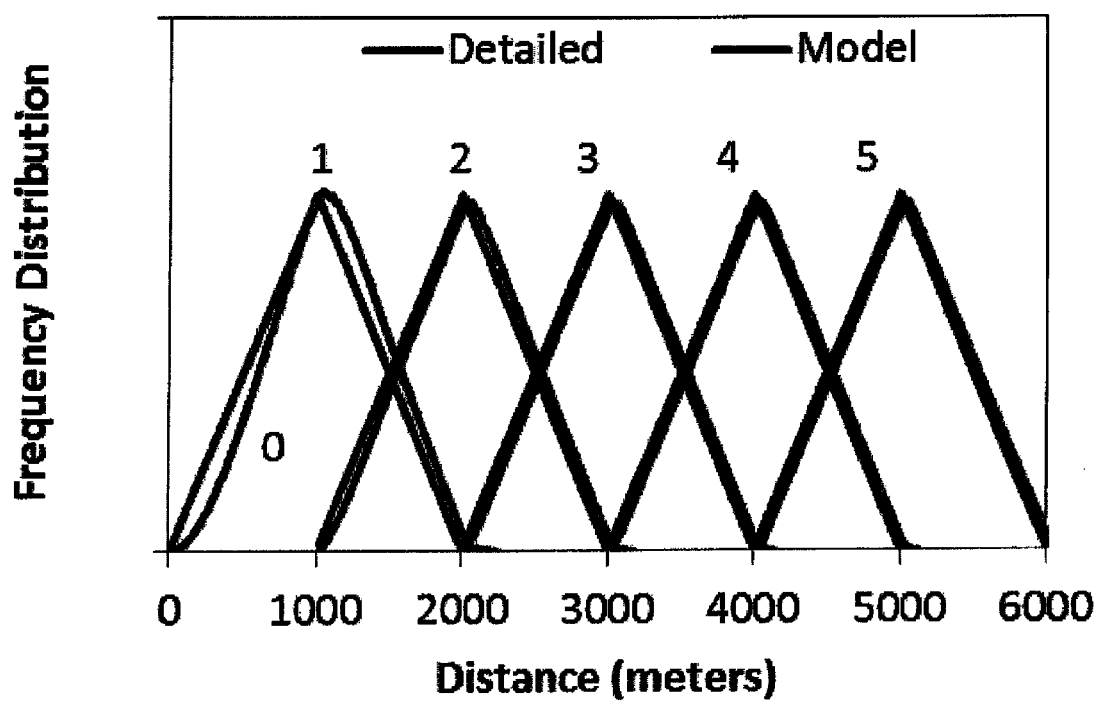
FIG. 18 is a graph depicting, by way of example, results by application of the model.

This function is a probability density function because the integration over all possible values equals zero. FIG. 18 is a graph depicting, by way of example, results by application of this model.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for estimating photovoltaic power generation for use in photovoltaic fleet operation, comprising:
a computer comprising a processor and memory within which code for execution by the processor is stored, comprising:
an input sky clearness module configured to generate a set of sky clearness indexes as a ratio of each irradiance observation in a set of irradiance observations that has been regularly measured for a plurality of locations, which are each within a geographic region suitable for operation of a photovoltaic fleet, and clear sky irradiance;
a time series module configured to form a time series of the set of the sky clearness indexes for all of the locations within the geographic region; and
a fleet statistics module configured to determine fleet irradiance statistics for the photovoltaic fleet through statistical evaluation of the time series of the set of the sky clearness indexes, and to build power statistics for the photovoltaic fleet as a function of the fleet irradiance statistics and an overall power rating of the photovoltaic fleet.

2. A system according to claim 1, further comprising:
a stored time increment relating to a time resolution of the power statistics for the photovoltaic fleet;
a time lag correlation module configured to express a time lag correlation coefficient as a relationship between the power statistics for the photovoltaic fleet starting at a beginning of a time period and the power statistics for the photovoltaic fleet starting at the beginning of the time period plus the time increment, and to apply the time lag correlation coefficient to the power statistics for the photovoltaic fleet over successive time increments to form a time series of the power statistics for the photovoltaic fleet.

3. A system according to claim 2, further comprising:
a stored power output for the photovoltaic fleet as part of the power statistics; and
a time lag correlation module further configured to express the time lag correlation coefficient in terms of the power rating of the photovoltaic fleet and the fleet irradiance statistics.

4. A system according to claim 1, further comprising:
a data collection module configured to collect area solar irradiance statistics, each comprising a set of pixels from satellite imagery for a physical area within the geographic region;
a data conversion module configured to convert the area solar irradiance statistics into irradiance statistics for an average point within the set of pixels; and
an area averaging module configured to evaluate an area function for each pixel by solving a discrete correlation coefficient matrix comprising correlation coefficients between point clearness indexes selected for pairs of the points in a satellite pixel, and to set the measured irradiance observations as the solution to the discrete correlation coefficient matrix.

5. A system according to claim 1, further comprising:
a data collection module configured to collect area solar irradiance statistics, each comprising a set of pixels from satellite imagery for a physical area within the geographic region;
a data conversion module configured to convert the area solar irradiance statistics into irradiance statistics for an average point within the set of pixels;
an area averaging module configured to evaluate an area function for each pixel by solving probability density function based on a distance for pairs of the points in a satellite pixel comprising solving an integral of the probability density function for the distance as a multiple of a correlation coefficient function at the distance, and to set the measured irradiance observations as the solution to the probability density function.

6. A system according to claim 1, further comprising:
a stored time period relating to a time resolution of the measuring of each irradiance observation in the set of irradiance observations; and
the time series module configured to divide the set of irradiance observations into a time series by increments of the time period, and to order the set of the sky clearness indexes based on their respective irradiance observation in the time series of the set of irradiance observations.

7. A system according to claim 6, further comprising:
a variance module configured to determine a variance of the set of the sky clearness indexes for the geographic region, and to adjust the variance as part of the fleet irradiance statistics relative to cloud speed over each photovoltaic station in the photovoltaic fleet, the time increments of the time period, and a physical area of each photovoltaic station.

8. A system according to claim 1, further comprising:
a power output for each of the photovoltaic stations stored as a multiple of the plane-of-array irradiance and the overall power rating of the photovoltaic fleet;
the fleet statistics module further configured to adjust the power statistics for the photovoltaic fleet relative to the power output of each photovoltaic station;
an orientation module configured to identify the individual sky clearness index corresponding to the location of the photovoltaic station within the geographic region, and to obtain an orientation factor of photovoltaic panels for each photovoltaic station within the geographic region; and
a plane-of-array irradiance module configured to represent a plane-of-array irradiance for each photovoltaic station in the photovoltaic fleet as a product of the individual sky clearness index, clear sky global horizontal irradiance, and the orientation factor of the photovoltaic station's photovoltaic panels.

9. A system according to claim 1, further comprising:
a data collection module configured to collect raw measured irradiance from ground-based weather stations, and to assemble the irradiance observations as point statistics, each comprising an average of all values of the raw measured irradiance.

10. A system according to claim 1, further comprising:
the fleet statistics module configured to determine the fleet irradiance statistics comprising at least one of:
a mean module configured to evaluate a mean of the sky clearness indexes over each time period increment in the time series;
a change in mean module configured to evaluate a change in the mean of the sky clearness indexes over each time period increment in the time series;
a variance module configured to evaluate a variance of the sky clearness indexes over each time period increment in the time series; and
a change in variance module configured to evaluate a change in the variance of the sky clearness indexes over each time period increment in the time series.

11. A computer-implemented method for estimating photovoltaic power generation for use in photovoltaic fleet operation, comprising the steps of:
generating a set of sky clearness indexes as a ratio of each irradiance observation in a set of irradiance observations that has been regularly measured for a plurality of locations, which are each within a geographic region suitable for operation of a photovoltaic fleet, and clear sky irradiance;
forming a time series of the set of the sky clearness indexes for all of the locations within the geographic region;
determining fleet irradiance statistics for the photovoltaic fleet through statistical evaluation of the time series of the set of the sky clearness indexes; and
building power statistics for the photovoltaic fleet as a function of the fleet irradiance statistics and an overall power rating of the photovoltaic fleet,
wherein the steps are performed on a suitably-programmed computer.

12. A method according to claim 11, further comprising the steps of:
selecting a time increment relating to a time resolution of the power statistics for the photovoltaic fleet;
expressing a time lag correlation coefficient as a relationship between the power statistics for the photovoltaic fleet starting at a beginning of a time period and the power statistics for the photovoltaic fleet starting at the beginning of the time period plus the time increment; and
applying the time lag correlation coefficient to the power statistics for the photovoltaic fleet over successive time increments to form a time series of the power statistics for the photovoltaic fleet.

13. A method according to claim 12, further comprising the steps of:
determining a power output for the photovoltaic fleet as part of the power statistics; and
expressing the time lag correlation coefficient in terms of the power rating of the photovoltaic fleet and the fleet irradiance statistics.

14. A method according to claim 11, further comprising the steps of:
collecting area solar irradiance statistics, each comprising a set of pixels from satellite imagery for a physical area within the geographic region;
converting the area solar irradiance statistics into irradiance statistics for an average point within the set of pixels;
evaluating an area function for each pixel by solving a discrete correlation coefficient matrix comprising correlation coefficients between point clearness indexes selected for pairs of the points in a satellite pixel; and
setting the measured irradiance observations as the solution to the discrete correlation coefficient matrix.

15. A method according to claim 11, further comprising the steps of:
collecting area solar irradiance statistics, each comprising a set of pixels from satellite imagery for a physical area within the geographic region;
converting the area solar irradiance statistics into irradiance statistics for an average point within the set of pixels;
evaluating an area function for each pixel by solving probability density function based on a distance for pairs of the points in a satellite pixel comprising solving an integral of the probability density function for the distance as a multiple of a correlation coefficient function at the distance; and
setting the measured irradiance observations as the solution to the probability density function.

16. A method according to claim 11, further comprising the steps of:
selecting a time period relating to a time resolution of the measuring of each irradiance observation in the set of irradiance observations;
dividing the set of irradiance observations into a time series by increments of the time period; and
ordering the set of the sky clearness indexes based on their respective irradiance observation in the time series of the set of irradiance observations.

17. A method according to claim 16, further comprising the steps of:
determining a variance of the set of the sky clearness indexes for the geographic region; and
adjusting the variance as part of the fleet irradiance statistics relative to cloud speed over each photovoltaic station in the photovoltaic fleet, the time increments of the time period, and a physical area of each photovoltaic station.

18. A method according to claim 11, further comprising the steps of:
  setting a power output for each of the photovoltaic stations as a multiple of the plane-of-array irradiance and the overall power rating of the photovoltaic fleet;
  adjusting the power statistics for the photovoltaic fleet relative to the power output of each photovoltaic station;
  identifying the individual sky clearness index corresponding to the location of the photovoltaic station within the geographic region;
  obtaining an orientation factor of photovoltaic panels for each photovoltaic station within the geographic region; and
  representing a plane-of-array irradiance for each photovoltaic station in the photovoltaic fleet as a product of the individual sky clearness index, clear sky global horizontal irradiance, and the orientation factor of the photovoltaic station's photovoltaic panels.

19. A method according to claim 11, further comprising the steps of:
  collecting raw measured irradiance from ground-based weather stations; and
  assembling the irradiance observations as point statistics, each comprising an average of all values of the raw measured irradiance.

20. A method according to claim 11, further comprising the steps of:
  determining the fleet irradiance statistics comprising at least one of the steps of:
    evaluating a mean of the sky clearness indexes over each time period increment in the time series;
    evaluating a change in the mean of the sky clearness indexes over each time period increment in the time series;
    evaluating a variance of the sky clearness indexes over each time period increment in the time series; and
    evaluating a change in the variance of the sky clearness indexes over each time period increment in the time series.

21. A non-transitory computer readable storage medium storing code for executing on a computer system to perform the method according to claim 11.

22. A computer-implemented apparatus for estimating photovoltaic power generation for use in photovoltaic fleet operation, comprising:
  means for generating a set of sky clearness indexes as a ratio of each irradiance observation in a set of irradiance observations that has been regularly measured for a plurality of locations, which are each within a geographic region suitable for operation of a photovoltaic fleet, and clear sky irradiance;
  means for forming a time series of the set of the sky clearness indexes for all of the locations within the geographic region;
  means for determining fleet irradiance statistics for the photovoltaic fleet through statistical evaluation of the time series of the set of the sky clearness indexes; and
  means for building power statistics for the photovoltaic fleet as a function of the fleet irradiance statistics and an overall power rating of the photovoltaic fleet.

\* \* \* \* \*